United States Patent
Iwasa et al.

(10) Patent No.: US 12,324,479 B2
(45) Date of Patent: Jun. 10, 2025

(54) SHOCK ABSORBER, SHOE SOLE, AND SHOE

(71) Applicant: ASICS CORPORATION, Kobe (JP)

(72) Inventors: Yutaro Iwasa, Kobe (JP); Yoshiyasu Ando, Kobe (JP); Keita Ozawa, Kobe (JP)

(73) Assignee: ASICS CORPORATION, Kobe (JP)

( * ) Notice: Subject to any disclaimer, the term of this patent is extended or adjusted under 35 U.S.C. 154(b) by 188 days.

(21) Appl. No.: 17/847,540

(22) Filed: Jun. 23, 2022

(65) Prior Publication Data
US 2022/0408880 A1    Dec. 29, 2022

(30) Foreign Application Priority Data
Jun. 24, 2021  (JP) .................. 2021-105023

(51) Int. Cl.
A43B 13/18   (2006.01)
F16F 3/087   (2006.01)
F16F 7/12    (2006.01)

(52) U.S. Cl.
CPC .......... *A43B 13/186* (2013.01); *F16F 3/0876* (2013.01); *F16F 7/121* (2013.01)

(58) Field of Classification Search
CPC .............................. A43B 13/186; F16F 3/0876
USPC ............................................................. 36/37
See application file for complete search history.

(56) References Cited

U.S. PATENT DOCUMENTS 10,302,252 B2 *  5/2019  Kuczek .................... F17C 1/14
11,529,235 B2 * 12/2022  Sharp ..................... B33Y 70/10
2009/0321045 A1 * 12/2009  Hernon .................. B22D 25/02
                                               165/80.2
2015/0014323 A1 *  1/2015  Loukus .................... B32B 3/266
                                                428/34.1
2017/0260707 A1 *  9/2017  Burt ......................... B28B 7/00
2018/0049514 A1    2/2018  Guyan et al.
2020/0229538 A1 *  7/2020  Yoshinaga ............. B29D 35/00
(Continued)

FOREIGN PATENT DOCUMENTS

CN       213281741 U    5/2021
JP       2005-288159 A  10/2005
JP       2017-527637 A   9/2017
(Continued)

OTHER PUBLICATIONS

"Notice of Reasons for Refusal" Office Action issued in JP 2021-105023; mailed by the Japanese Patent Office on Dec. 3, 2024.

*Primary Examiner* — Timothy K Trieu
(74) *Attorney, Agent, or Firm* — Studebaker Brackett PLLC

(57) ABSTRACT

A shock absorber includes a shock absorbing portion having a three-dimensional shape formed by a wall in which an outer shape is defined by a pair of parallel curved surfaces. The shock absorbing portion includes at least one three-dimensional structure body obtained by changing a shape of a unit structure body thickened based on a unit structure of a Schwartz P structure. The shape of the three-dimensional structure body in an unloaded state is a shape obtained by changing the shape of the unit structure so as to follow the shape change of the unit structure body, which is the regular hexahedron shaped space occupied by the unit structure body, into the trapezoidal space.

12 Claims, 17 Drawing Sheets

(56) References Cited

U.S. PATENT DOCUMENTS

2023/0000206 A1 1/2023 Hatano et al.

FOREIGN PATENT DOCUMENTS

| WO | 2015/200201 A1 | 12/2015 |
| WO | 2021/111667 A1 | 6/2021 |

* cited by examiner

SHOCK ABSORBER, SHOE SOLE, AND SHOE

This nonprovisional application is based on Japanese Patent Application No. 2021-105023 filed on Jun. 24, 2021 with the Japan Patent Office, the entire contents of which are hereby incorporated by reference.

BACKGROUND OF THE INVENTION

Field of the Invention

The present invention relates to a shock absorber absorbing shock, a shoe sole including the shock absorber, and a shoe including the shoe sole.

Description of the Background Art

Conventionally, various types of shock absorbers for absorbing shock have been known, and these various types of shock absorbers have been used depending on the application. For example, a shoe may have a shoe sole provided with a shock absorber in order to absorb shock caused upon landing. The shock absorber provided to the shoe sole is typically composed of a member made of resin or rubber.

In recent years, there have also been developed shoes having a shoe sole provided with a part having a lattice structure, a web structure or the like so that not only a material but also a structure provides an enhanced shock absorbing function. A shoe comprising a shoe sole provided with a part having a lattice structure is disclosed for example in U.S. Patent Publication No. 2018/0049514.

Japanese National Patent Publication No. 2017-527637 describes that a three-dimensional object which is manufactured in a three-dimensional additive manufacturing method can be manufactured by adding thickness to a geometrical surface structure, such as an internally hollowed polyhedron or a triply periodic minimal surface, and discloses that composing the three-dimensional object of an elastic material allows the object to be applied for example to a shoe sole.

SUMMARY OF THE INVENTION

At this point, in general, a property required for the shock absorber includes tending to gradually increase a load when the shock absorber is compressively deformed. When the shock absorber has such the property, the shock absorber is stably displaced in a process of increasing the load applied from the outside, so that excellent shock absorbing performance is obtained. For example, when the shock absorber having such the performance is applied to the shoe sole, the shoe having significantly excellent wearing comfortableness can be obtained.

Consequently, an object of the present invention is to provide a shock absorber having excellent shock absorbing performance, and a shoe sole and a shoe including the shock absorber.

The inventor of the present invention has found that the shock absorber made of an elastic material thickened based on a Schwartz P structure, which is one of triple periodic minimum curved surface structures, as a reference has a property that a load rapidly decreases at a time point when compressive displacement reaches a certain value in a case where the shock absorber is compressively deformed. This property is not necessarily preferable in consideration of general use as the shock absorber, and for example, the wearing comfortableness may be impaired when the shock absorber is applied to the shoe sole.

In this respect, the inventor has conceived that the above-described problem can be solved by changing the shape of a unit structure body of the shock absorber thickened based on the Schwartz P structure in an unloaded state to a predetermined shape, and has completed the present invention.

A shock absorber according to an aspect of the present disclosure includes a shock absorbing portion having a three-dimensional shape formed by a wall in which an outer shape is defined by a pair of parallel curved surfaces. The shock absorbing portion includes at least one three-dimensional structure body obtained by changing the shape of the unit structure body thickened based on the unit structure of the Schwartz P structure. The shape of the three-dimensional structure body in the unloaded state is a shape obtained by changing the shape of the unit structure body so as to follow the shape change of the unit space body, which is a regular hexahedron shaped space occupied by the unit structure body, into a trapezoidal space.

The shoe sole of the present invention includes the above-described shock absorber of the present invention.

The shoe of the present invention includes the shoe sole of the present invention, and an upper provided above the shoe sole.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the accompanying drawings. In the following embodiments, identical or common portions are identically denoted in the figures, and will not be described repeatedly.

First Embodiment

Figure 1A:
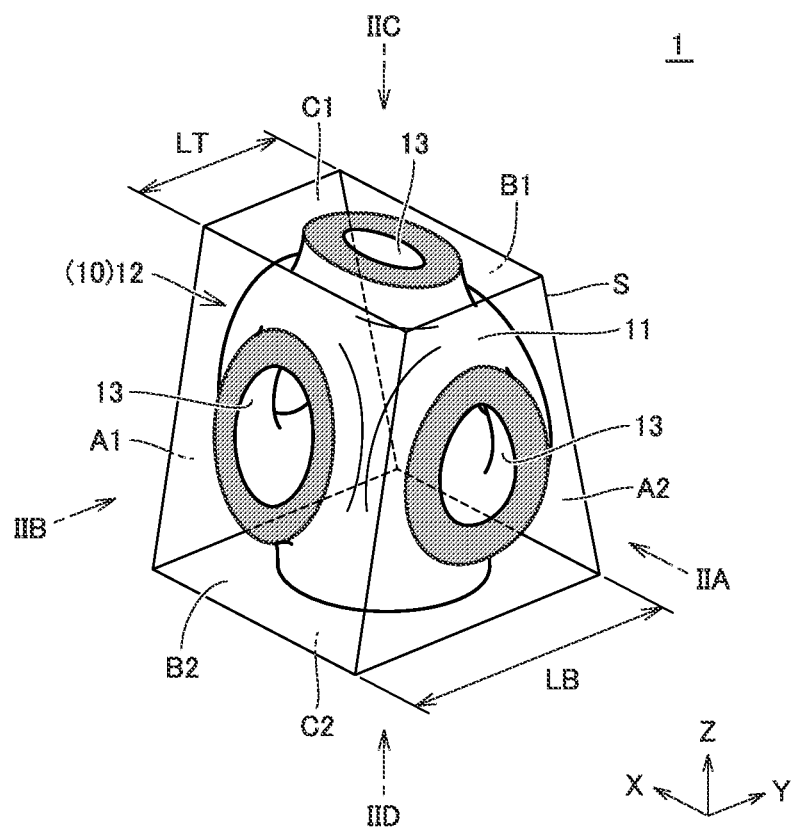
FIG. 1A is a perspective view illustrating a three-dimensional structure body of a shock absorber according to a first embodiment.
Figure 1B:
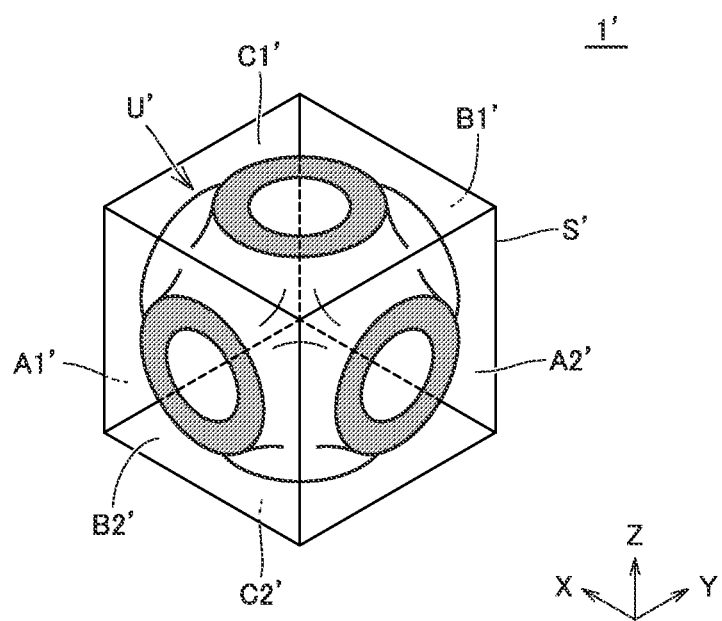
FIG. 1B is a perspective view illustrating a unit structure body obtained by thickening a unit structure of a Schwartz P structure based on the unit structure.
Figure 2C:
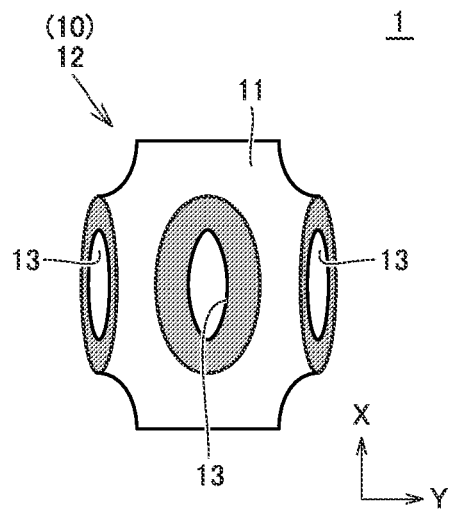
FIG. 2C is a plan view illustrating the three-dimensional structure body of the shock absorber of the first embodiment.
Figure 2B:
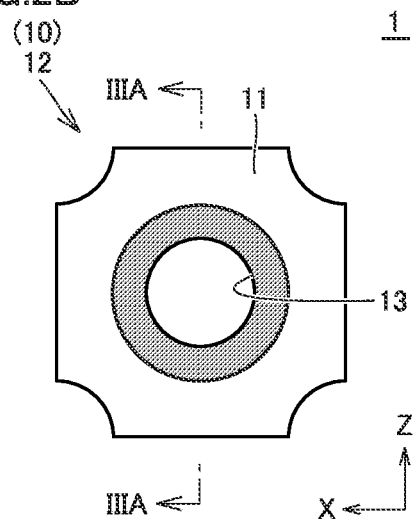
FIG. 2B is a left side view illustrating the three-dimensional structure body of the shock absorber of the first embodiment.
Figure 2A:
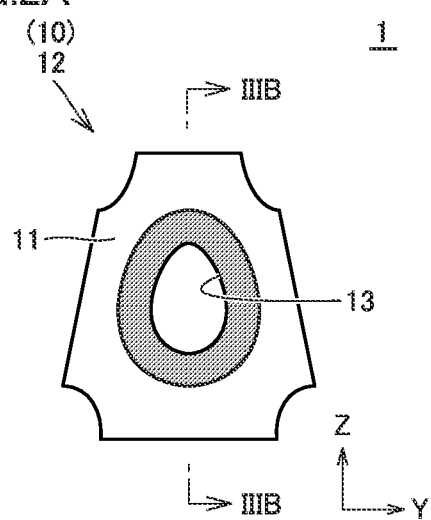
FIG. 2A is a front view illustrating the three-dimensional structure body of the shock absorber of the first embodiment.
Figure 2D:
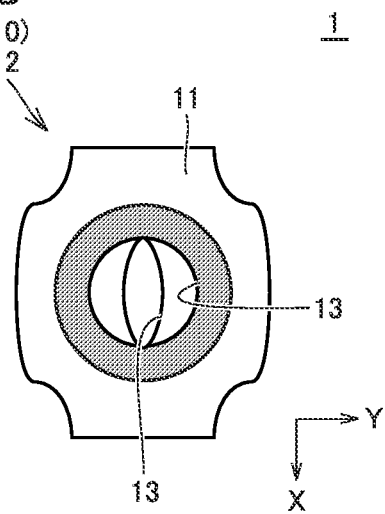
FIG. 2D is a bottom view illustrating the three-dimensional structure body of the shock absorber of the first embodiment.
Figure 3A:
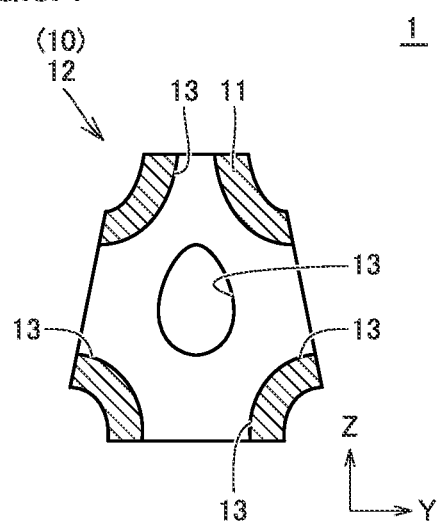
FIGS. 3A and 3B are sectional views illustrating the three-dimensional structure body of the shock absorber of the first embodiment.
Figure 3B:
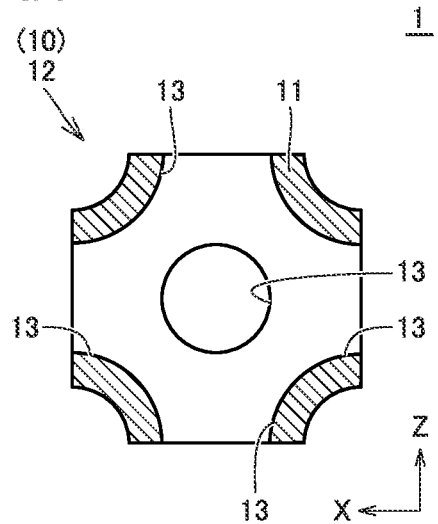

FIG. 1A is a perspective view illustrating a three-dimensional structure body of a shock absorber according to a first embodiment, and FIG. 1B is a perspective view illustrating a unit structure body obtained by thickening a unit structure of a Schwartz P structure based on the unit structure. FIGS. 2A to 2D are a front view, a left side view, a plan view, and a bottom view illustrating the three-dimensional structure body of the shock absorber in FIG. 1A as viewed along directions of arrows IIA to IID in FIG. 1A. FIG. 3A is a sectional view taken along line IIIA-IIIA in FIG. 2B, and FIG. 3B is a sectional view taken along line IIIB-IIIB in FIG. 2A. With reference to FIGS. 1A to 3B, a shock absorber 1 of the first embodiment will be described below.

As illustrated in FIGS. 1A to 3B (however, FIG. 1B is excluded), the shock absorber 1 includes a shock absorbing portion 10 that exhibits a shock absorbing function. The shock absorbing portion 10 has a three-dimensional shape formed by a wall 11 having an external shape defined by a pair of parallel curved surfaces, and has a geometric wall structure having a cavity therein. The shock absorbing portion 10 includes at least one three-dimensional structure body 12 having a shape in the unloaded state as illustrated in the drawing.

As illustrated in FIG. 1A, a unit space S occupied by the three-dimensional structure body 12 has a table shape, and the unit space S is defined by a pair of opposing surfaces A1, A2 located in an X-axis direction illustrated in the drawing, a pair of opposing surfaces B1, B2 located in a Y-axis direction illustrated in the drawing, and a pair of opposing surfaces C1, C2 located in a Z-axis direction illustrated in the drawing. The shock absorbing portion 10 of the shock absorber 1 is intended to exert a shock absorbing function by receiving a load particularly in the Z-axis direction among the X-axis direction, the Y-axis direction, and the Z-axis direction.

The pair of opposing surfaces A1, A2 located in the X-axis direction has the same size and the same shape in a plan view, and each of the pair of opposing surfaces A1, A2 is a trapezoid in which a length LT of an upper side, which is one side of the pair of sides extending in the Y-axis direction, is shorter than a length LB of a lower side that is the other side. The pair of opposing surfaces B1, B2 located in the Y-axis direction has the same size and the same shape in a plan view, and has a rectangular shape. Each of the pair of opposing surfaces C1, C2 located in the Z-axis direction has a rectangular shape in a plan view, but the length LT of the pair of sides extending in the Y-axis direction of one surface C1 is shorter than the length LB of the pair of sides extending in the Y-axis direction of the other surface C2.

Thus, the unit space S is configured of a trapezoidal space in which the pair of opposing surfaces B1, B2 located in the Y-axis direction is inclined. As a result, the three-dimensional structure body 12 includes an end on the side where the opposing surfaces B1, B2 are located as an inclined end.

A ratio between the side lengths LT, LB is not particularly limited, but preferably satisfies a condition of $1.1 \leq LT/LB \leq 4.0$.

In each of the surfaces A1, A2, B1, B2, C1, C2 included in the three pairs of opposing surfaces, an opening 13 located at an end of the three-dimensional structure body 12 is located. At this point, in FIGS. 1A to 3B (however, FIG. 1B is excluded), in order to easily understand the shape of the three-dimensional structure body 12, end surfaces of the three-dimensional structure body 12 located in each of the X-axis direction, the Y-axis direction, and the Z-axis direction are denoted by a dark color to distinguish the end surfaces from other outer surfaces of the three-dimensional structure body 12.

The three-dimensional structure body 12 of the shock absorber 1 is obtained by changing the shape of a unit structure body U' of a shock absorber 1' as a reference in FIG. 1B, and has a shape in FIGS. 1A to 3B (however, FIG. 1B is excluded) in the unloaded state.

As illustrated in FIG. 1B, the unit structure body U' of the shock absorber 1' as the reference is thickened based on the unit structure of the Schwartz P structure, which is a type of a mathematically defined triple periodic minimum curved surface. Note that a minimal surface is defined as a curved surface of those having a given closed curve as a boundary that is minimal in area.

A unit space S' occupied by the unit structure body U' has a regular hexahedron shape (cubic shape), and the unit space S' is defined by a pair of opposing surfaces A1', A2' located in the X-axis direction, a pair of opposing surfaces B1', B2' located in the Y-axis direction, and a pair of opposing surfaces C1', C2' located in the Z-axis direction. Each of the surfaces A1', A2', B1', B2', C1', C2' included in the three pairs of opposing faces is a square in a plan view.

The shape of the three-dimensional structure body 12 of the shock absorber 1 in the unloaded state is a shape obtained by changing the shape of the unit structure body U' so as to follow the change of the shape of the regular hexahedron shaped unit space S' of the shock absorber 1' as the reference into the trapezoidal space. More particularly, the shape of the three-dimensional structure body 12 in the unloaded state is a shape obtained by changing the shape of the unit structure body U' so as to follow the shape change when the shape of the regular hexahedron shaped unit space S' of the shock absorber 1' as the reference is changed to the trapezoidal space by inclining each of the surfaces included in one pair of opposing surfaces B1, B2 located in the Y-axis direction among the three pairs of opposing surfaces.

At this point, as described above, the shock absorbing portion 10 of the shock absorber 1 may include at least one three-dimensional structure body 12 having the shape in the unloaded state as illustrated in the drawing.

That is, when the shock absorbing portion 10 is configured of only one type of unit structure body, the one type of the unit structure body is configured of the three-dimensional structure body 12 as illustrated in the drawing, and in this case, the number of the three-dimensional structure bodies 12 may be only one or plural. When the number of the three-dimensional structure bodies 12 is plural, the plurality of the three-dimensional structure bodies 12 may be repeatedly arranged along at least one of the X-axis direction, the Y-axis direction, and the Z-axis direction.

In addition, when the shock absorber 1 is configured of a plurality of types of unit structure bodies, the one type of the unit structure body is configured of the three-dimensional structure body 12 as illustrated in the drawing, and in this case, the number of the three-dimensional structure bodies 12 may be only one or plural. When the number of the three-dimensional structure bodies 12 is plural, the plurality of the three-dimensional structure bodies 12 may be repeatedly arranged with or without another type of unit structure body sandwiched therebetween along at least one of the X-axis direction, the Y-axis direction, and the Z-axis direction.

In addition to the shock absorbing portion 10, the shock absorber 1 may further include a support 20 (see FIG. 12 and the like), a fixing wall 30 (see FIG. 12 and the like), reinforcing portions 40, 40', 40" (see FIG. 13 and the like), an extension portion 50 (see FIG. 18), and the like, which will be described later. In this case, these regions are provided adjacent to the shock absorbing portion 10 described above.

A method for manufacturing the shock absorber 1 is not limited, but for example, the shock absorber 1 can be manufactured using a three dimensional additive manufacturing apparatus.

While the shock absorber 1 may basically be formed of any material having a large elastic force, it is preferably formed of a resin material or a rubber material. More specifically, when the shock absorber 1 is formed of resin, the shock absorber 1 can be formed of, for example, polyolefin resin, an ethylene-vinyl acetate copolymer (EVA), a polyamide-based thermoplastic elastomer (TPA, TPAE), thermoplastic polyurethane (TPU), or a polyester-based thermoplastic elastomer (TPEE). When the shock absorber 1 is formed of rubber, it can be formed for example of butadiene rubber.

The shock absorber 1 may be composed of a polymer composition. In that case, examples of a polymer to be contained in the polymer composition include olefinic polymers such as olefinic elastomers and olefinic resins. The olefinic polymers for example include polyolefins of polyethylene (e.g., linear low density polyethylene (LLDPE), high density polyethylene (HDPE), and the like), polypropylene, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methyl-pentene copolymer, an ethylene-1-butene copolymer, a 1-butene-1-hexene copolymer, 1-butene-4-methyl-pentene, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer (EVA), a propylene-vinyl acetate copolymer, and the like.

The polymer may be an amide-based polymer such as an amide-based elastomer and an amide-based resin. Examples of the amide-based polymer include polyamide 6, polyamide 11, polyamide 12, polyamide 66, and polyamide 610.

The polymer may be an ester-based polymer such as an ester-based elastomer and an ester-based resin. Examples of the ester-based polymer include polyethylene terephthalate and polybutylene terephthalate.

The polymer may be a urethane-based polymer such as a urethane-based elastomer and a urethane-based resin. Examples of the urethane-based polymer include polyester-based polyurethane and polyether-based polyurethane.

The polymer may be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), and acrylonitrile butadiene styrene resin (ABS).

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, epoxy-based methacrylic polymers, conjugated diene polymer-based methacrylic polymers and hydrogenated products thereof, polyvinyl chloride-based resins, silicone-based elastomers, butadiene rubber (BR), isoprene rubber (IR), chloroprene rubber (CR), natural rubber (NR), styrene-butadiene rubber (SBR), acrylonitrile-butadiene rubber (NBR), butyl rubber (IIR), and the like.

Shock absorber 1 of the first embodiment is excellent in shock absorbing performance. Hereinafter, this point will be described in detail based on the result of the first verification test performed by the present inventor.

Figure 4A:
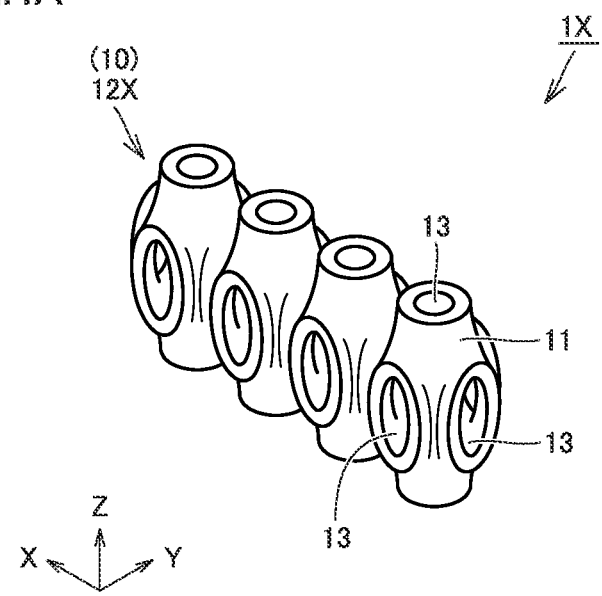
FIG. 4A is a perspective view of a shock absorber according to a first comparative example.
Figure 4B:
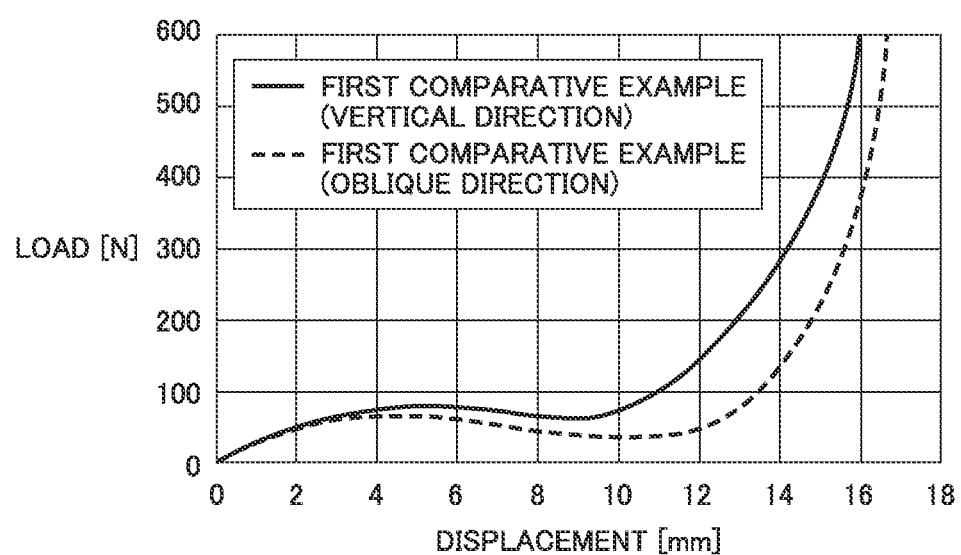
FIG. 4B is a graph illustrating a simulation result of shock absorbing performance of the shock absorber of the first comparative example.
Figure 5A:
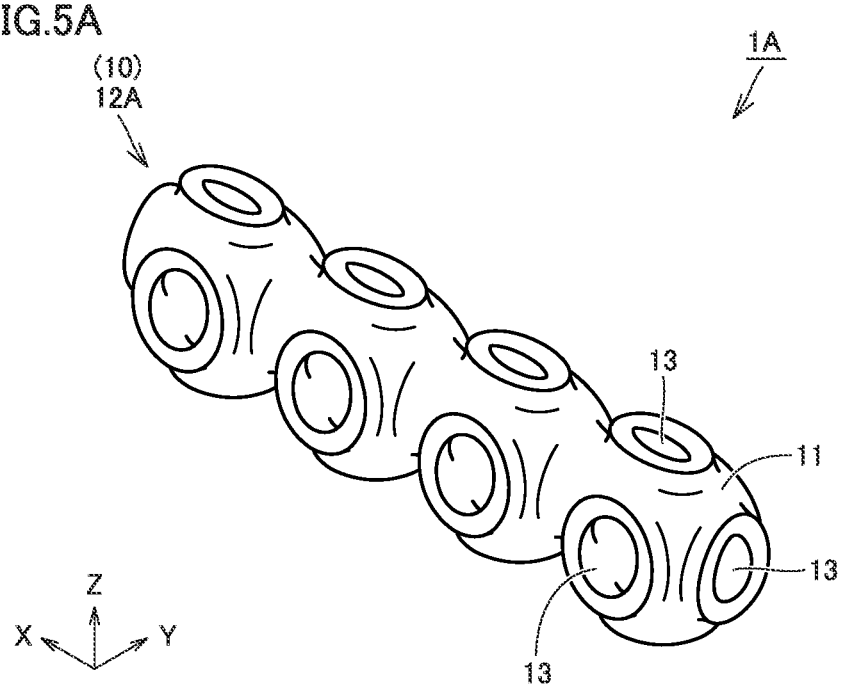
FIG. 5A is a perspective view of a shock absorber according to a first example.
Figure 5B:
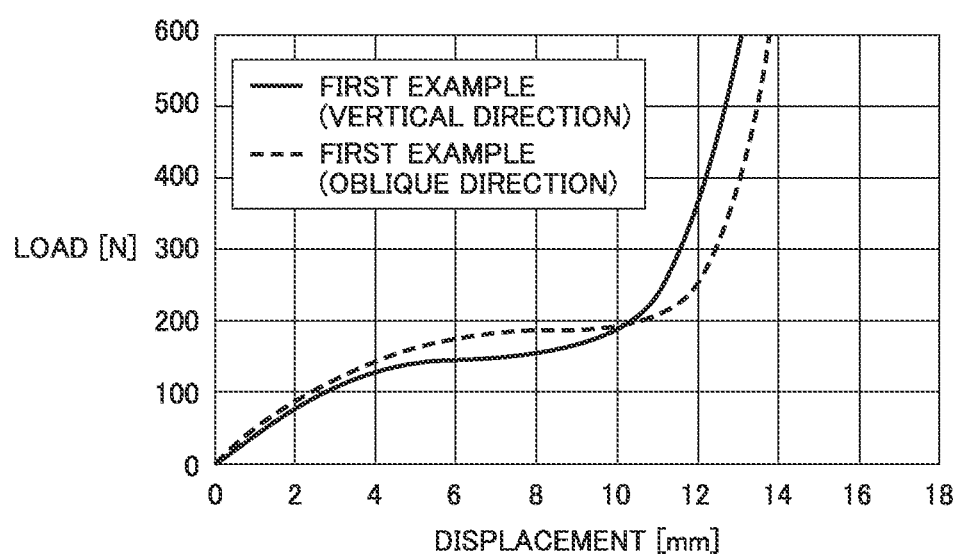
FIG. 5B is a graph illustrating a simulation result of the shock absorbing performance of the shock absorber of the first example.

FIG. 4A is a perspective view of a shock absorber according to a first comparative example, and FIG. 4B is a graph illustrating a simulation result of the shock absorbing performance of the shock absorber of the first comparative example. FIG. 5A is a perspective view of a shock absorber of a first example, and FIG. 5B is a graph illustrating a simulation result of the shock absorbing performance of the shock absorber of the first example.

In the first verification test, the models of the shock absorbers of the first comparative example and the first example were specifically designed, it was assumed that the case where external force was applied to these models along a predetermined direction, and a behavior in that case was individually analyzed by simulation. More specifically, what is called a load-displacement curve was obtained for each of these models.

At this point, as illustrated in FIG. 4A, a shock absorber 1X of the first comparative example has a three-dimensional structure body 12X in which the shape in the unloaded state is obtained by stretching the regular hexahedron shaped unit space S' of the shock absorber 1' as the reference only in the Z-axis direction, and changing the shape of the unit structure body U' so as to follow the shape change of the unit space S' to the unit space having a rectangular parallelepiped shape. On the other hand, similarly to the shock absorber 1 of the first embodiment, the shock absorber 1A of the first example has a three-dimensional structure body 12A in which the shape in the unloaded state is obtained by changing the shape of the unit structure body U' so as to follow the shape change of the regular hexahedron shaped unit space S' of the shock absorber 1' as the reference when the shape of the regular hexahedron shaped unit space S' is changed to the trapezoidal shape.

More particularly, in the shock absorber 1X of the first comparative example, the dimensions in the X-axis direction and the Y-axis direction of the three-dimensional structure body 12X as the unit structure body were set to 10 mm, and the dimension in the Z-axis direction of the three-dimensional structure body 12X was set to 20 mm. The thickness of wall 11 of the three-dimensional structure body 12X was set to 1.52 mm, and the material thereof was assumed to be a urethane-based acrylic polymer having an elastic modulus of 7.1 MPa.

On the other hand, in the shock absorber 1A of the first example, the dimensions of the three-dimensional structure body 12A as the unit structure body in the X-axis direction and the Z-axis direction were set to 10 mm and 20 mm, and the lengths LT, LB of the three-dimensional structure body 12A in FIG. 1A were set to 10 mm and 20 mm. The thickness of the wall 11 of the three-dimensional structure body 12A was set to 2.32 mm, and the material thereof was assumed to be a urethane-based acrylic polymer having an elastic modulus of 7.1 MPa.

In addition, the directions of the external forces applied to the shock absorbers 1X, 1A of the first comparative example and the first example were a vertical direction (that is, in the Z-axis direction) and an oblique direction (that is, a direction orthogonal to the X-axis direction and intersecting both the Y-axis direction and the Z-axis direction). FIGS. 4A and 5A exemplarily illustrate the state in which each four of the three-dimensional structure bodies 12X, 12A are arranged along the X-axis direction.

As illustrated in FIG. 4B, the shock absorber 1X of the first comparative example has a property that the load rapidly decreases when the compressive displacement reaches a certain value in both the case where the external force is applied in the vertical direction and the case where the external force is applied in the oblique direction. This property is not necessarily preferable in consideration of general use as the shock absorber, and for example, when the shock absorber 1X is applied to the shoe sole, there is a risk that the wearing comfortableness is impaired.

On the other hand, as illustrated in FIG. 5B, the shock absorber 1A of the first example has a property that the load gradually increases in both the case where the external force is applied in the vertical direction and the case where the external force is applied in the oblique direction. This property is suitable in consideration of general use as the shock absorber, and the shock absorber is stably displaced in the process of increasing the load applied from the outside. Therefore, for example, when the shock absorber 1A is applied to the shoe sole, the shoe having significantly excellent wearing comfortableness can be obtained.

Consequently, using the shock absorber 1 of the first embodiment, the shock absorber having the excellent shock absorbing performance can be used for various applications. When the three-dimensional structure bodies are arranged in a row like shock absorber 1A of the first example, it is preferable that the directions (that is, the Z-axis direction) intended to exhibit the shock absorbing function in each of the plurality of three-dimensional structure bodies are disposed substantially parallel to each other.

Figure 6A:
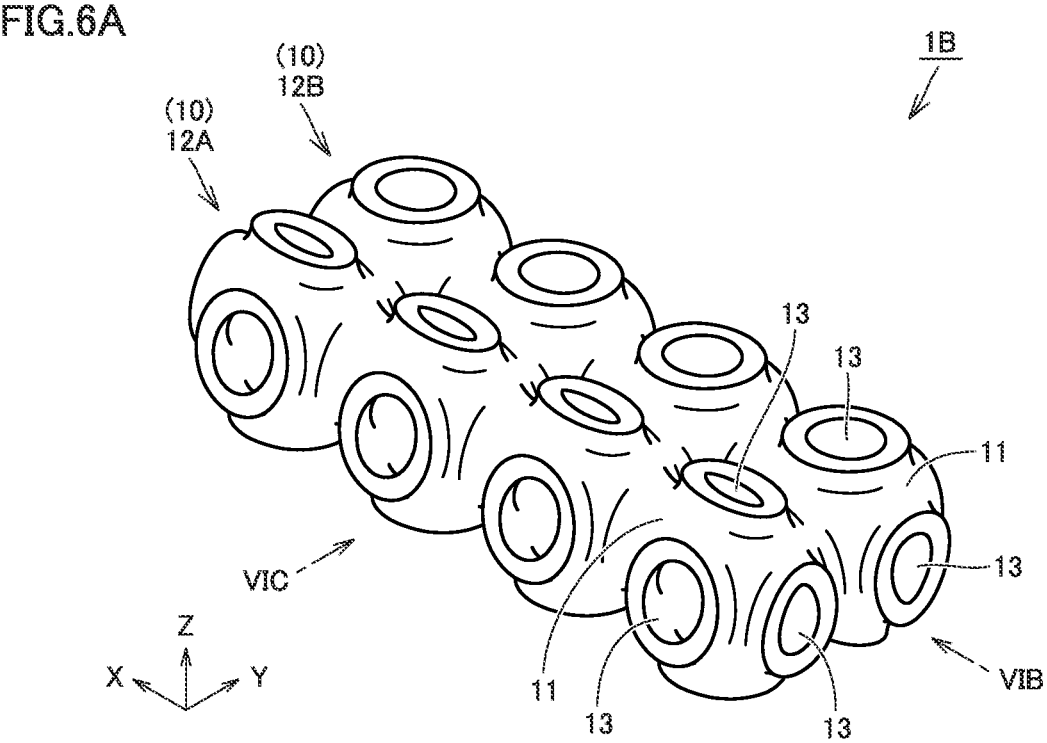
FIG. 6A is a perspective view of a shock absorber according to a second example.
Figure 6B:
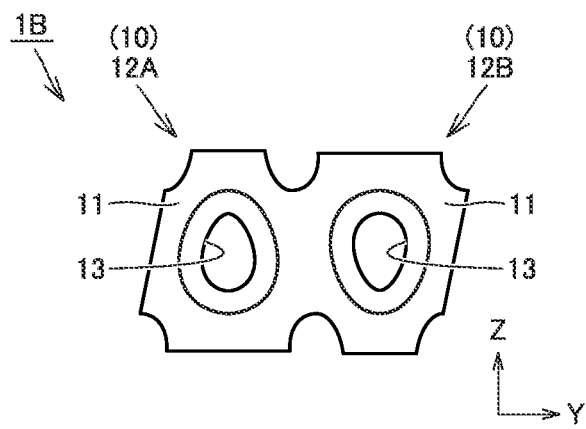
FIG. 6B is a front view of the shock absorber of the second example.
Figure 6C:
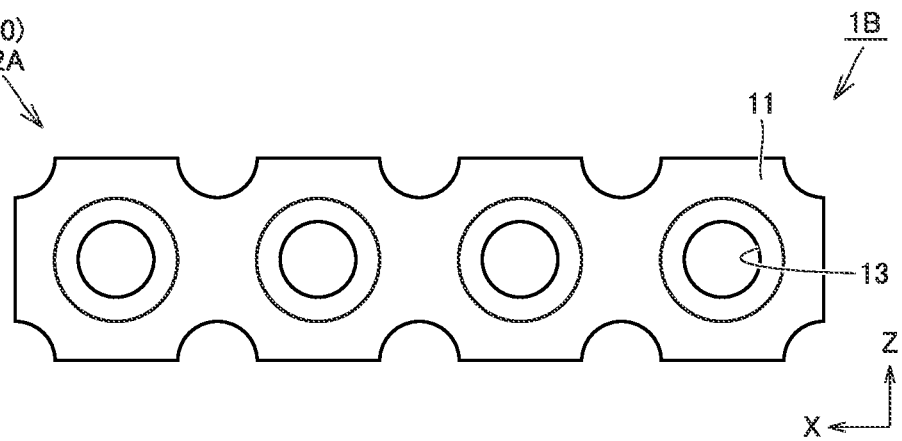
FIG. 6C is a left side view of the shock absorber of the second example.

FIG. 6A is a perspective view of a shock absorber according to a second example, and FIGS. 6B and 6C are a front view and a left side view of the shock absorber in FIG. 6A as viewed along directions of arrows VIB and VIC in FIG. 6A. With reference to FIGS. 6A to 6C, a shock absorber 1B of the second example will be described below.

As illustrated in FIGS. 6A to 6C, the shock absorber 1B of the second example includes two types of three-dimensional structure bodies 12A, 12B as the unit structure body. Similarly to the shock absorber 1 of the first embodiment described above, the shape of each of the two types of three-dimensional structure bodies 12A, 12B in the unloaded state is the shape obtained by changing the shape of the unit structure body U' so as to follow the shape change of regular hexahedron shaped unit space S' of shock absorber 1' as the reference into the trapezoidal space, and the trapezoidal shape of the three-dimensional structure body 12B is inverted from the three-dimensional structure body 12A in the Z-axis direction. The three-dimensional structure body 12A is the same as the three-dimensional structure body 12A included in the shock absorber 1A of the first example.

In the shock absorber 1B of the second example, each four of the three-dimensional structure bodies 12A, 12B are arranged along the X-axis direction to form rows, and the three-dimensional structure bodies 12A, 12B arranged in the two columns are arranged in columns in the Y-axis direction. When the three-dimensional structure bodies are arranged in this manner, the outer shape of the shock absorber 1B is substantially a parallelogram when viewed along the X-axis direction (see FIG. 6B).

Also in the shock absorber 1B configured as described above, similarly to the shock absorber 1 of the first embodiment, the shock absorber having the excellent shock absorbing performance can be used for various applications. When the three-dimensional structure bodies are arranged in a matrix shape, it is preferable that the directions (that is, the Z-axis direction) intended to exhibit the shock absorbing function in each of the plurality of three-dimensional structure bodies are disposed substantially parallel to each other.

Figure 7A:
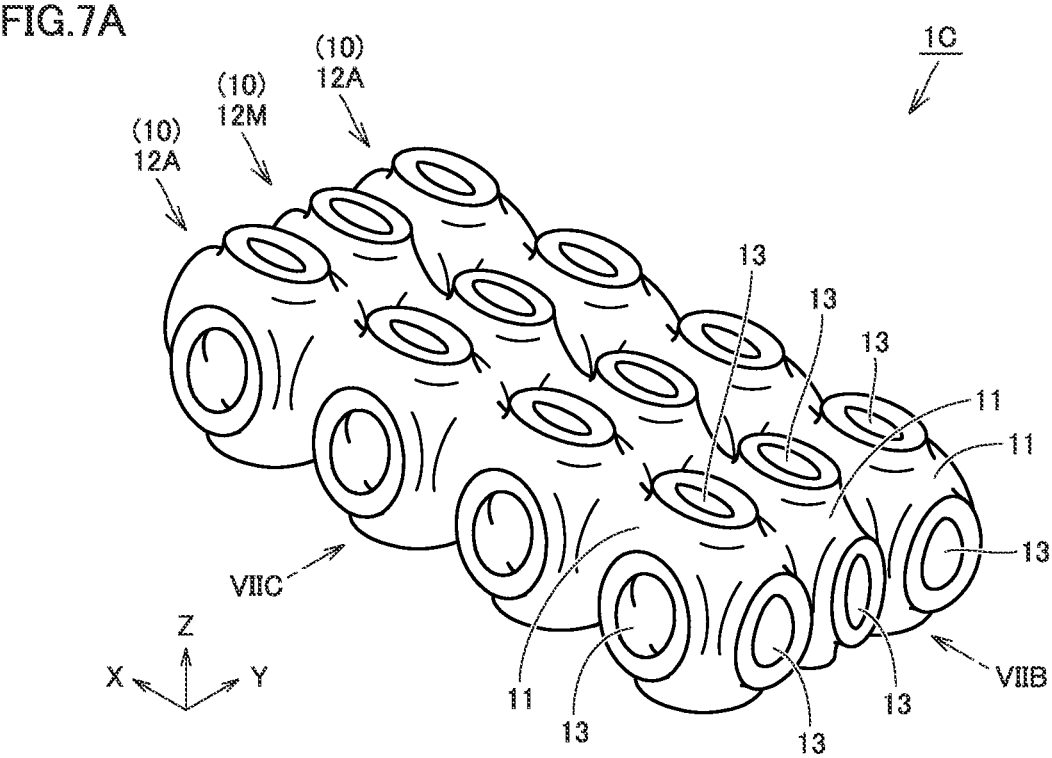
FIG. 7A is a perspective view of a shock absorber according to a third example.
Figure 7B:
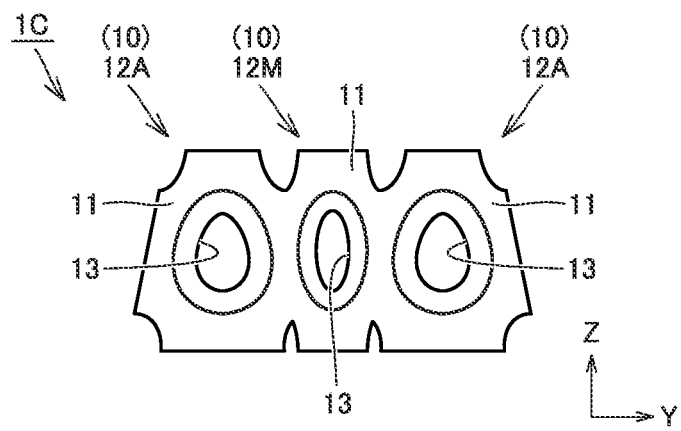
FIG. 7B is a front view of the shock absorber of the third example.
Figure 7C:
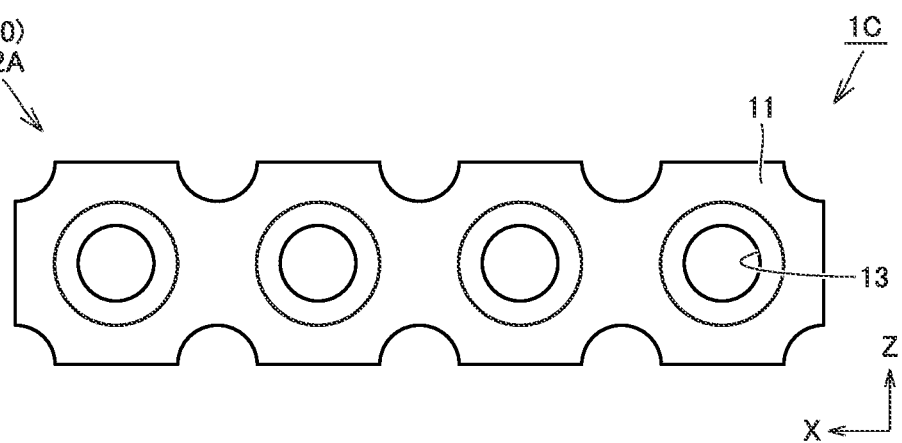
FIG. 7C is a left side view of the shock absorber of the third example.

FIG. 7A is a perspective view of a shock absorber according to a third example, and FIGS. 7B and 7C are a front view and a left side view of the shock absorber in FIG. 7A as viewed along directions of arrows VIIB and VIIC in FIG. 7A. With reference to FIGS. 7A to 7C, a shock absorber 1C of the third example will be described below.

As illustrated in FIGS. 7A to 7C, the shock absorber 1C of the third example includes two types of three-dimensional structure bodies 12A, 12M as the unit structure body. Similarly to the shock absorber 1 of the first embodiment, the shape of the three-dimensional structure body 12A in the unloaded state is the shape obtained by changing the shape of the unit structure body U' so as to follow the shape of the regular hexahedron shaped unit space S' of the shock absorber 1' as the reference when the shape of the unit space S' is changed to the trapezoidal shape of the shock absorber 1'. Unlike the shock absorber 1 of the first embodiment, the shape of the remaining three-dimensional structure body 12M in the unloaded state is the shape obtained by changing the shape of the unit structure body U' so as to follow the shape of the regular hexahedron shaped unit space S' of the shock absorber 1' as the reference when the shape of the unit space S' is changed to the unit space having the flat rectangular parallelepiped shape. The three-dimensional structure body 12A is the same as the three-dimensional structure body 12A included in the shock absorber 1A of the first example.

In the shock absorber 1C of the third example, each four of the three-dimensional structure bodies 12A, 12M are arranged along the X-axis direction to form the column, and one column including the three-dimensional structure body 12M is arranged between two rows including the three-dimensional structure body 12A, so that the three-dimensional structure bodies 12A, 12M arranged in these three rows are arranged in columns in the Y-axis direction. When the three-dimensional structure bodies are arranged in this manner, the outer shape of the shock absorber 1C is substantially trapezoidal as a whole when viewed along the X-axis direction (see FIG. 7B).

Also in the shock absorber 1C configured as described above, similarly to the shock absorber 1 of the first embodiment, the shock absorber having the excellent shock absorbing performance can be used for various applications. When the three-dimensional structure bodies are arranged in a matrix shape, it is preferable that the directions (that is, the Z-axis direction) intended to exhibit the shock absorbing function in each of the plurality of three-dimensional structure bodies are disposed substantially parallel to each other.

In the first embodiment, the description has been given by exemplifying the case where the shape of the three-dimensional structure bodies 12, 12A in the unloaded state is the shape obtained by changing the shape of the unit structure body U' so as to follow the change in the shape of the regular hexahedron shaped unit space S' of the shock absorber 1' as the reference to the trapezoidal space by inclining each of the surfaces included in the pair of opposing surfaces B1, B2 located in the Y-axis direction among the three pairs of opposing surfaces, but this may be appropriately changed.

For example, the shape of the three-dimensional structure body in the unloaded state may be the shape obtained by changing the shape of the regular hexahedron shaped unit space S' of the shock absorber 1' as the reference to the trapezoidal shape by inclining not only the surfaces included in the pair of opposing surfaces B1, B2 located in the Y-axis direction among the three pairs of opposing surfaces but also the surfaces included in the pair of opposing surfaces A1, A2 located in the X-axis direction so as to change the shape to the trapezoidal space, or in addition to this, when the shape of the unit structure body U' is changed to the substantially trapezoidal shape by slightly inclining or curving the pair of opposing surfaces C1, C2 located in the Z-axis direction so as to change the shape to the substantially trapezoidal space, the shape may be obtained by changing the shape of the unit structure body U' so as to follow this.

When the three-dimensional structure body has any of these shapes, similarly to shock absorber 1 of the first embodiment, the shock absorber having the excellent shock absorbing performance can be used for various applications.

Second Embodiment

Figure 8:
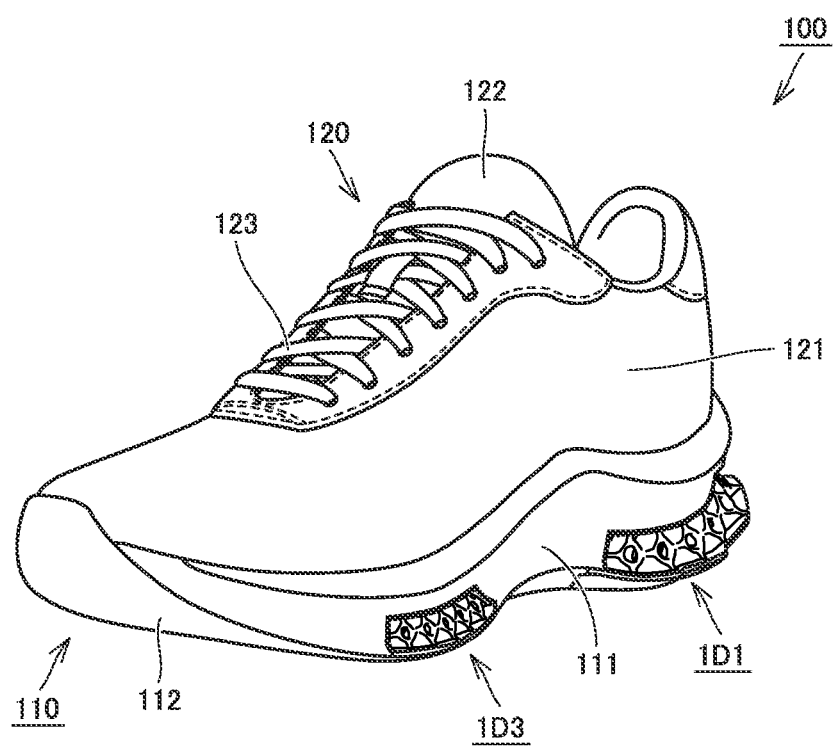
FIG. 8 is a perspective view illustrating a shoe sole and a shoe according to a second embodiment.
Figure 9:
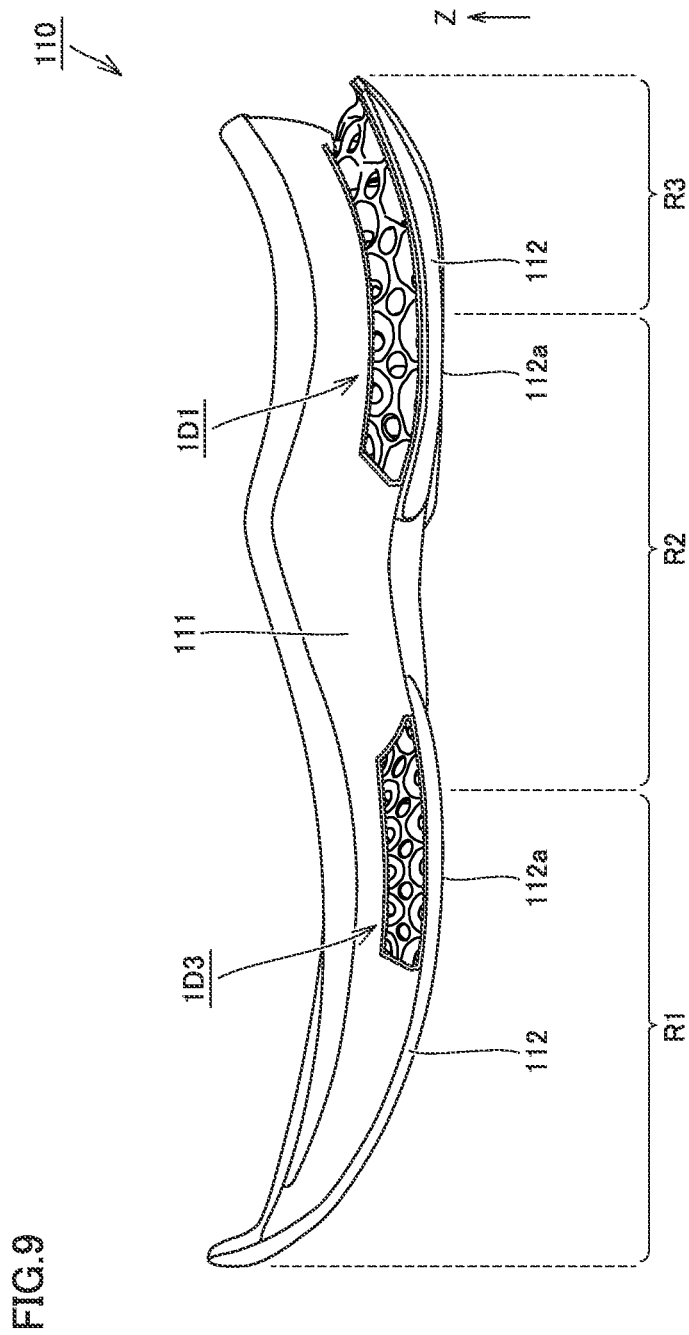
FIG. 9 is a side view illustrating the shoe sole of the second embodiment as viewed from a lateral foot side.
Figure 10:
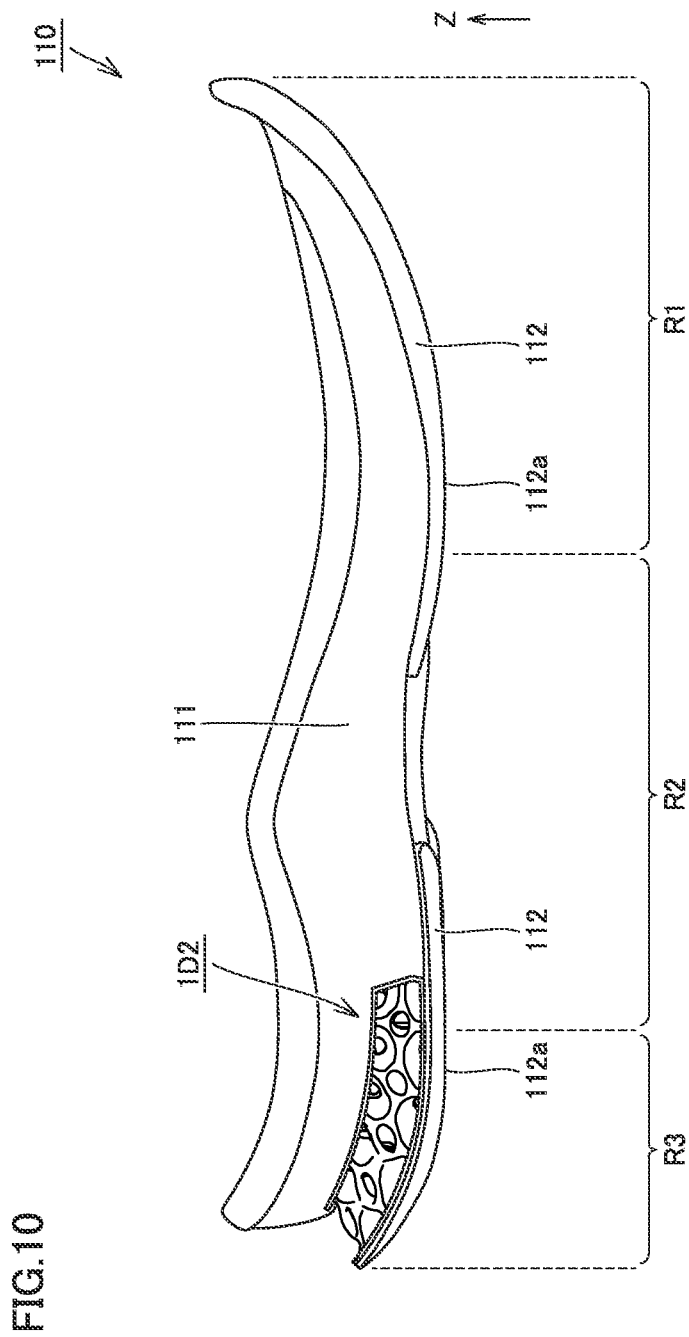
FIG. 10 is a side view illustrating the shoe sole of the second embodiment as viewed from a medial foot side.
Figure 11:
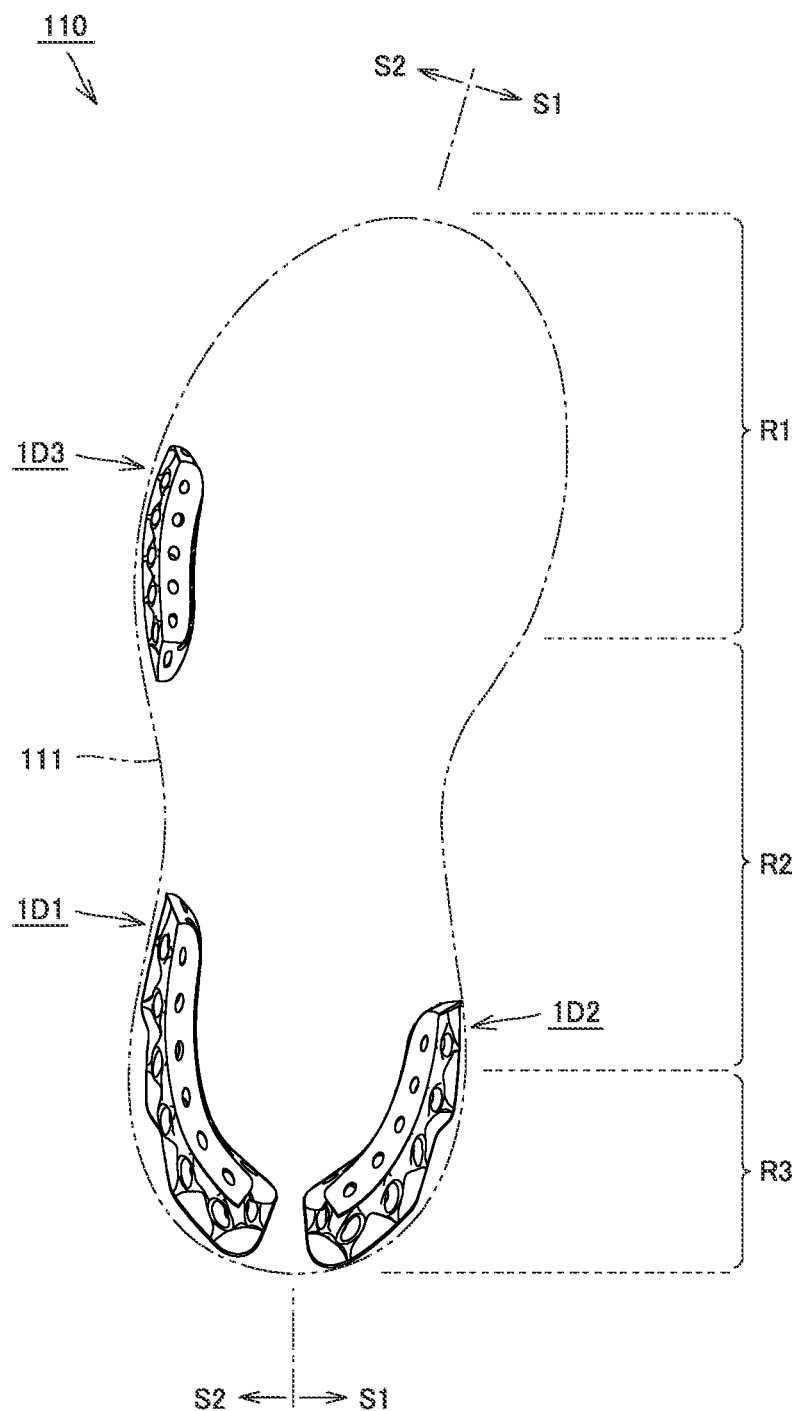
FIG. 11 is a schematic plan view illustrating a disposition position of the shock absorber in the shoe sole of the second embodiment.

FIG. 8 is a perspective view illustrating a shoe sole and a shoe according to a second embodiment. FIGS. 9 and 10 are side views of the shoe sole in FIG. 8 as viewed from a lateral foot side and a medial foot side. FIG. 11 is a schematic plan view illustrating a disposition position of the shock absorber in the shoe sole in FIG. 8. With reference to FIGS. 8 to 11, a shoe sole 110 of the second embodiment and a schematic configuration of a shoe 100 including the shoe sole 110 will be described.

As illustrated in FIG. 8, the shoe 100 includes the shoe sole 110 and an upper 120. The shoe sole 110 is a member that covers the sole of a foot and has a generally flat shape. The upper 120 has a shape that at least covers the entirety of a portion of a foot inserted in the shoe that is located on the side of the bridge of the foot, and the upper 120 is located above the shoe sole 110.

The upper 120 includes an upper body 121, a tongue 122, and a shoelace 123. Of these, the tongue 122 and the shoelace 123 are both fixed to or attached to the upper body 121.

The upper body 121 has an upper portion provided with an upper opening for exposing an upper portion of an ankle and a portion of the bridge of a foot. The upper body 121 has a lower portion provided with a lower opening covered with the shoe sole 110 as an example and has a lower end French-seamed or the like to form a bottom portion as another example.

The tongue 122 is fixed to the upper body 121 by sewing, welding, bonding, or a combination thereof so as to cover a portion of the upper opening provided in the upper body 121 that exposes a portion of the bridge of a foot. For the upper body 121 and the tongue 122, woven fabric, knitted fabric, nonwoven fabric, synthetic leather, resin, or the like is used for example, and for a shoe required to be air permeable and lightweight, in particular, a double raschel warp knitted fabric with a polyester yarn knitted therein is used.

The shoelace 123 is composed of a member in the form of a string for drawing portions of a peripheral edge of the upper opening provided to the upper body 121 and exposing a portion of the bridge of a foot together in the direction of the width of the foot, and the shoelace 123 is passed through a plurality of hole provided through the peripheral edge of the upper opening. When a foot is inserted in the upper body 121 and the shoelace 123 is tightened, the upper body 121 can be brought into close contact with the foot.

As illustrated in FIGS. 8 to 11, the shoe sole 110 includes a midsole 111 as a sole body, an outsole 112, and shock absorbers 1D1 to 1D3.

The midsole 111 includes an upper surface, a lower surface, and side surfaces connecting the upper surface and the lower surface, and constitutes an upper portion of the shoe sole 110. The upper surface of the midsole 111 is joined to the upper 120.

The midsole 111 preferably has an appropriate strength and also excellently absorbs shock, and from this viewpoint, the midsole 111 can be a member for example of resin or rubber, and suitably composed of a foam material or a non-foam material such polyolefin resin, an ethylene-vinyl acetate copolymer (EVA), polyamide-based thermoplastic elastomer (TPA, TPAE), thermoplastic polyurethane (TPU), polyester-based thermoplastic elastomer (TPEE), and the like, in particular.

The outsole 112 includes an upper surface and a lower surface as a tread 112*a*, and constitutes a lower portion of the shoe sole 110. The outsole 112 is mainly joined to the midsole 111.

The outsole 112 preferably provides excellent abrasion resistance and excellent grip, and from this viewpoint, the outsole 112 can be made of rubber, for example. A tread pattern may be provided on a lower surface of the outsole 112, or the tread 112*a*, from the viewpoint of providing enhanced grip.

The shock absorber 1D1 to 1D3 is disposed so as to be aligned with the midsole 111 in the direction intersecting the thickness direction (Z-axis direction) of the sole body including the midsole 111 and the outsole 112, and more specifically, is disposed in a cutout provided at a predetermined position of the midsole 111. Thus, the shock absorber 1D1 to 1D3 is sandwiched between the midsole 111 and the outsole 112 in the thickness direction of the sole body. The shock absorber 1D1 to 1D3 is joined to the midsole 111 and the outsole 112 with an adhesive as described later, and a part of the shock absorber 1D1 to 1D3 is located so as to be exposed on a peripheral surface of the shoe sole 110.

As illustrated in FIGS. 9 to 11, in a front-back direction (a horizontal direction in FIGS. 9 and 10, a vertical direction in FIG. 11) that is a direction matched with a length direction of a foot of a wearer in a plan view, the shoe sole 110 is divided into a forefoot R1 supporting toe and ball of the foot of the wearer, a midfoot R2 supporting an arch of the foot of the wearer, and a rearfoot R3 supporting a heel of the foot of the wearer.

When a position corresponding to 40% of a dimension in the front-rear direction of the shoe sole 110 from the front-side end is set as a first boundary position, and a position corresponding to 80% of the dimension in the front-rear direction of the shoe sole 110 from the front-side end is set as a second boundary position with respect to the front-side end of the shoe sole 110, the forefoot R1 corresponds to a portion included between the front-side end and the first boundary position along the front-rear direction, the midfoot R2 corresponds to a portion included between the first boundary position and the second boundary position along the front-rear direction, and the rearfoot R3 corresponds to a portion included between the second boundary position and the rear-side end of the shoe sole along the front-rear direction.

In addition, as illustrated in FIG. 11, the shoe sole 110 is divided into a portion on the medial foot side (a portion on the S1 side in FIG. 11) that is the median side (that is, the side close to the median line) in the anatomical normal position of the foot and a portion on the lateral foot side (a portion on the S2 side in FIG. 11) that is the opposite side (that is, the side far from the median line) to the median side in the anatomical normal position of the foot, along the horizontal direction (the horizontal direction in FIG. 11) that is the direction matched with the foot width direction of the foot of the wearer in a plan view.

As illustrated in FIGS. 8 to 11, the midsole 111 extends in the front-rear direction from the forefoot R1 to the rearfoot R3 through the midfoot R2. The outsole 112 includes a portion disposed so as to straddle the forefoot R1 and the front position in the front-rear direction of the midfoot R2, and a portion disposed so as to straddle the rear position in the front-rear direction of the midfoot R2 and the rearfoot R3.

The shock absorber 1D1 is located along an edge of the shoe sole 110 on the lateral foot side so as to straddle a portion closer to the rearfoot R3 of the midfoot R2 and the rearfoot R3. The shock absorber 1D2 is located along the edge of the shoe sole 110 on the medial foot side so as to straddle a portion closer to the rearfoot R3 of the midfoot R2 and the rearfoot R3. The shock absorber 1D3 is located along the edge of the shoe sole 110 on the lateral foot side so as to straddle a portion close to the midfoot R2 of the forefoot R1 and a portion close to the forefoot R1 of the midfoot R2.

Figure 12:
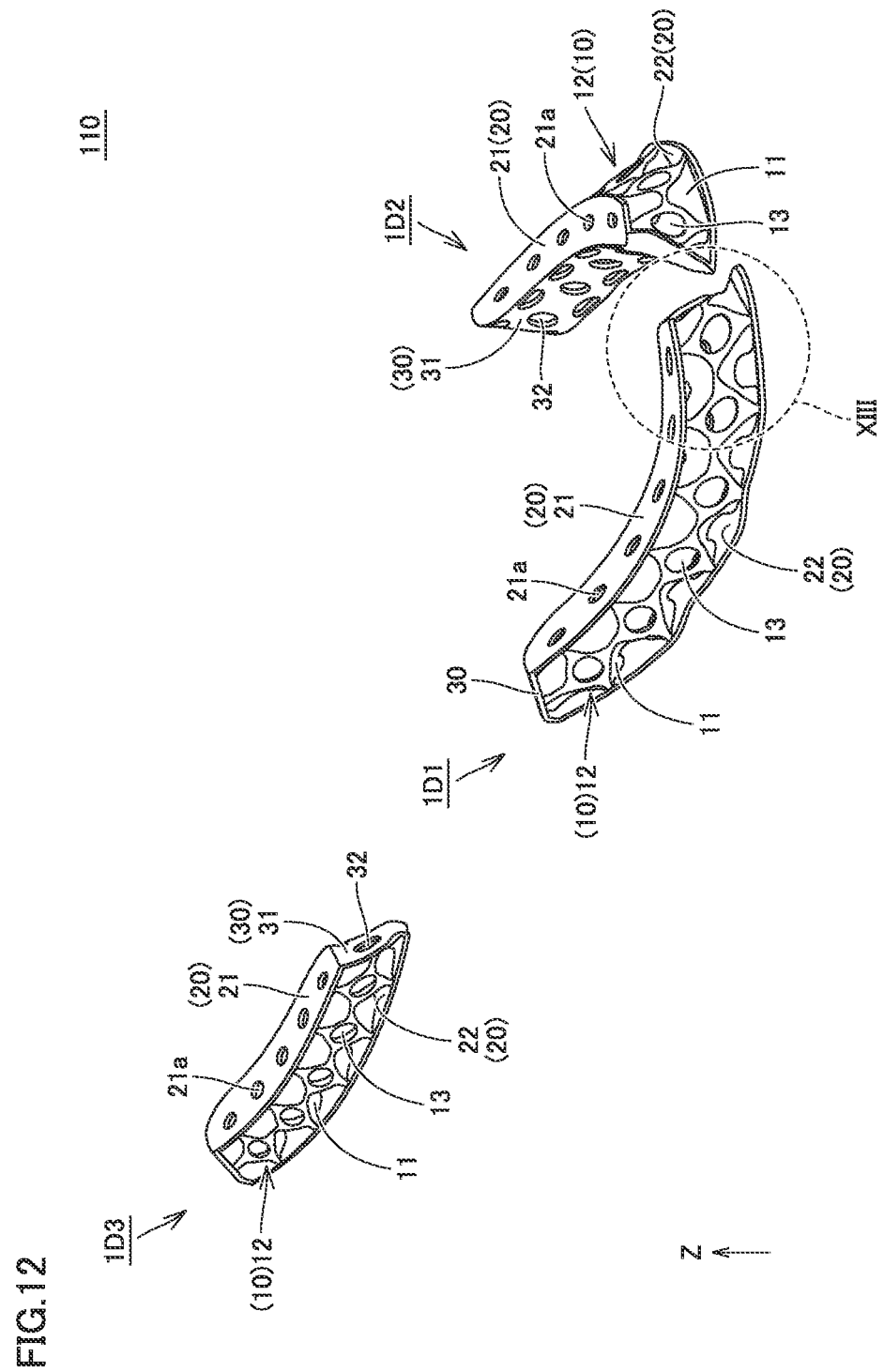
FIG. 12 is a perspective view illustrating the shock absorber included in the shoe sole of the second embodiment.
Figure 13:
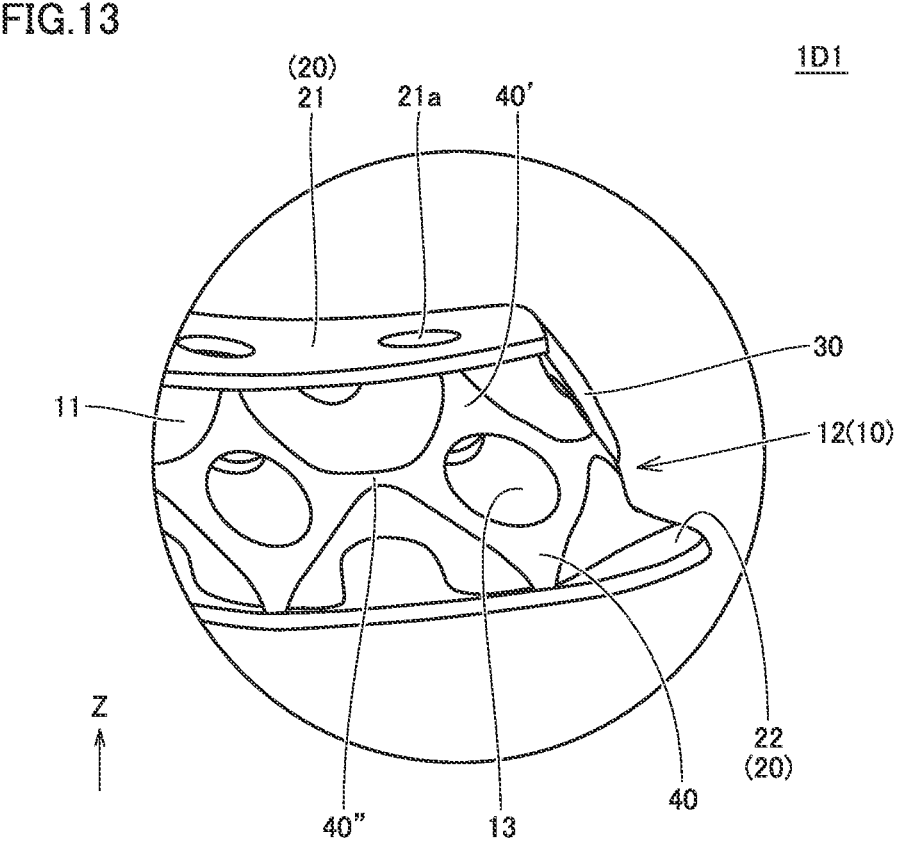
FIG. 13 is an enlarged view illustrating a main part of the shock absorber included in the shoe sole of the second embodiment.

FIG. 12 is a perspective view illustrating the shock absorber included in the shoe sole in FIG. 8, and FIG. 13 is an enlarged view of a region XIII in FIG. 12. With reference to FIGS. 12 and 13, a detailed configuration of the shock absorbers 1D1 to 1D3 will be described below.

As illustrated in FIGS. 12 and 13, each of the shock absorbers 1D1 to 1D3 has a configuration similar to the shock absorber 1 of the first embodiment, and includes the shock absorbing portion 10. The shock absorbing portion 10 has a three-dimensional shape formed by the wall 11 having the external shape defined by a pair of parallel curved surfaces, and includes the plurality of three-dimensional structure bodies 12 as the unit structure body.

Each of the plurality of three-dimensional structure bodies 12 has a shape obtained by changing the shape of the unit structure body U' so as to follow the change in the shape of the regular hexahedron shaped unit space S' (see FIG. 1A) of the shock absorber 1' as the reference into the trapezoidal space. In each of the shock absorbers 1D1 to 1D3, the plurality of three-dimensional structure bodies 12 are provided in a line in the direction along the edge of the shoe sole 110.

At this point, each of the plurality of three-dimensional structure bodies 12 is provided such that the direction (that is, the Z-axis direction) in which a shock absorbing function is intended to be exerted is all directed in the direction orthogonal to tread 112*a* of the outsole 112. With such the configuration, the load applied to the shoe sole 110 from the sole and the ground at the time of landing is absorbed by deformation of the shock absorbing portion 10 including the three-dimensional structure body 12 with a large displacement amount, and the load applied from the shoe sole 110 to the sole is reduced, and high shock absorbing performance is obtained.

The shock absorbers 1D1 to 1D3 includes the support 20 and the fixing wall 30 in addition to the shock absorbing portion 10. Both the support 20 and the fixing wall 30 are formed in a plate shape, and provided integrally with the shock absorbing portion 10 adjacent to the shock absorbing portion 10. The shock absorbers 1D1 to 1D3 are formed of a single member formed of the shock absorbing portion 10, the support 20, and the fixing wall 30 that are continuously connected to each other.

The support 20 is provided so as to be located in the direction (that is, the Z-axis direction) in which each of the plurality of three-dimensional structure bodies 12 of the shock absorbers 1D1 to 1D3 is intended to exhibit the shock absorbing function, and includes an upper support 21 on the side on which the upper 120 is located when viewed from the shock absorbing portion 10 and a lower support 22 on the side on which the outsole 112 is located when viewed from the shock absorbing portion 10. Thus, the shock absorbing portion 10 is sandwiched between the upper support 21 and the lower support 22.

A plurality of through-holes 21a are made in the upper support 21. The plurality of through-holes 21a are associated with and communicate with openings 13 that are located on the end surface on the side of the upper support 21 and included in the plurality of three-dimensional structure bodies 12. On the other hand, a plurality of through-holes 22a (see FIG. 14A) are also made in the lower support 22. The plurality of through-holes 22a are associated with and communicate with the openings 13 that are located on the end surface on the side of the lower support 22 and included in the plurality of three-dimensional structure bodies 12.

The fixing wall 30 is provided so as to be located in the direction intersecting the direction (that is, the Z-axis direction) in which each of the plurality of three-dimensional structure bodies 12 of the shock absorbers 1D1 to 1D3 is intended to exhibit the shock absorbing function, and more specifically, is provided in the portion of the shock absorbers 1D1 to 1D3 other than the portion exposed on the peripheral surface of the shoe sole 110. Thus, the end surface of the shock absorbing portion 10 located on the side on the midsole 111 of the peripheral surface is covered with the fixing wall 30.

The fixing wall 30 includes a second opposing surface 31 that is an exposed surface thereof. A plurality of through-holes 32 are made in the fixing wall 30. The plurality of through-holes 32 include those that are associated with and communicate with the openings 13 that are located on the end surface on the side of the fixing wall 30 and included in the plurality of three-dimensional structure bodies 12. In addition, the plurality of through-holes 32 do not correspond to the openings 13, and include a plurality of through-holes communicating with the space surrounding the periphery of the three-dimensional structure body 12 (the through-hole 32 will be described later in detail).

The plurality of through-holes 21a, 22a, 32 provided in the upper support 21, the lower support 22, and the fixing wall 30 mainly serve as discharge ports discharging the uncured resin at the time of manufacturing when the shock absorbers 1D1 to 1D3 are manufactured using the three-dimensional additive manufacturing method. That is, because the through-holes 21a, 22a, 32 communicate with the space inside the three-dimensional structure body 12 of the shock absorbing portion 10 and the space surrounding the periphery of the three-dimensional structure body 12, the uncured resin can be discharged through the through-holes 21a, 22a, 32 at the time of manufacturing, and the shock absorbing portion 10 having the desired shape can be shaped with high dimensional accuracy.

The upper support 21 and the fixing wall 30 are both regions fixed to the midsole 111, and the lower support 22 is a region fixed to the outsole 112. That is, because the shock absorbing portion 10 including the plurality of three-dimensional structure bodies 12 has the geometric wall structure as described above, when the shock absorbing portion 10 is fixed by directly bonding the shock absorbing portion 10 to the midsole 111 or the outsole 112 as it is, the deformation of the plurality of three-dimensional structure bodies 12 is hindered, and the desired shock absorbing performance cannot be obtained.

In this respect, by integrally providing the upper support 21, the lower support 22, and the fixing wall 30 with respect to the shock absorbing portion 10, the shock absorbers 1D1 to 1D3 can be fixed to the midsole 111 or the outsole 112 by adhesion while the deformation of the plurality of three-dimensional structure bodies 12 is prevented, and the desired shock absorbing performance can be obtained.

Figure 14A:
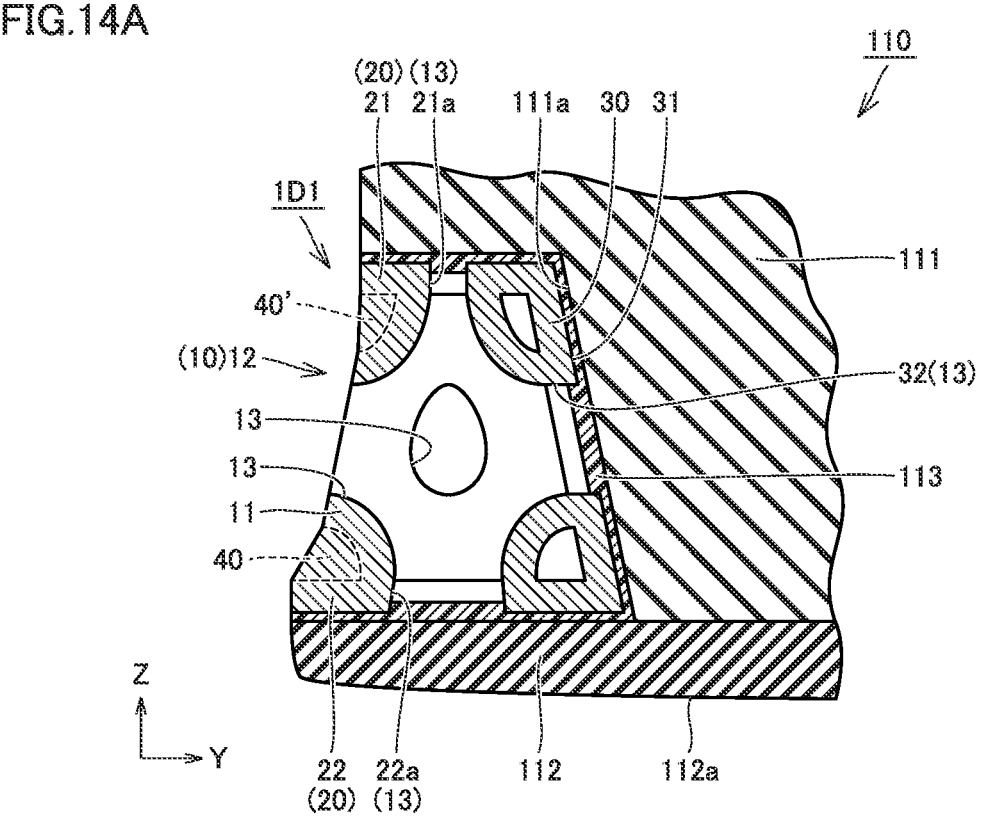
FIGS. 14A and 14B are partially sectional views of the shoe sole of the second embodiment.
Figure 14B:
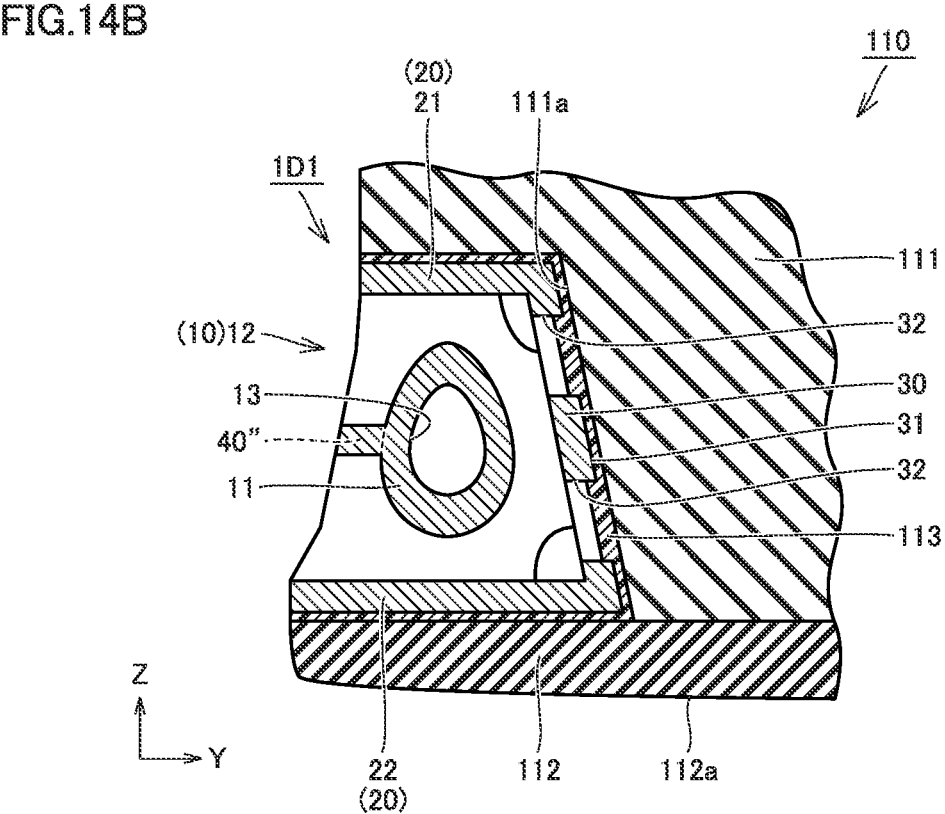

FIGS. 14A and 14B are partially sectional views of the shoe sole in FIG. 8. With reference to FIGS. 14A and 14B, assembly structures of the shock absorber 1D1 to 1D3 in the shoe sole 110 of the second embodiment will be described in detail below. In FIGS. 14A and 14B, the assembly structure of the shock absorbers 1D1 is representatively illustrated, but the same applies to the assembly structures of the shock absorbers 1D2, 1D3.

At this point, FIG. 14A is a sectional view illustrating the shoe sole 110 of the portion including the through-hole 32 (in FIG. 14A, the through-hole is particularly denoted by reference numeral 32 (13)) communicating with the opening 13 that is located at the end surface on the side of the fixing wall 30 and included in each of the plurality of three-dimensional structure bodies 12. On the other hand, FIG. 14B is a sectional view illustrating the shoe sole 110 of the portion including the through-hole 32 (in FIG. 14B, the through-hole is simply indicated by reference numeral 32) communicating with the space surrounding the periphery of the three-dimensional structure body 12.

As illustrated in FIGS. 14A and 14B, the shock absorber 1D1 is fixed to the midsole 111 and the outsole 112 through an adhesive layer 113. Specifically, in the shock absorber 1D1, the upper support 21 is joined to the wall surface on the upper side of the cutout provided in the midsole 111 through the adhesive layer 113, and the fixing wall 30 is joined to the wall surface on the side of the cutout provided in the midsole 111 through the adhesive layer 113. In the shock absorber 1D1, the lower support 22 is joined to the upper surface of the outsole 112 through the adhesive layer 113.

More specifically, both the wall surface on the upper side of the cutout of the midsole 111 and the upper surface of the upper support 21 are formed in a substantially planar shape, and the shock absorber 1D1 and the midsole 111 are fixed at the portion by bonding the adhesive layer 113 to these surfaces. As illustrated in FIG. 14A, the plurality of through-holes 21a is provided in the upper support 21 as described above, and a part of the adhesive layer 113 enters the plurality of through-holes 21a. Thus, an increase in bonding strength at the portion is achieved by an increase in bonding area and a kind of anchor effect.

Both the upper surface of the outsole 112 and the lower surface of the lower support 22 are formed in a substantially planar shape, and the shock absorber 1D1 and the outsole 112 are fixed at the portion by bonding the adhesive layer 113 to these surfaces. As illustrated in FIG. 14A, the plurality of through-holes 22a is provided in the lower support 22 as described above, and a part of the adhesive layer 113 enters the plurality of through holes 22a. Thus, an increase in bonding strength at the portion is achieved by an increase in bonding area and a kind of anchor effect.

Furthermore, the first opposing surface 111a that is the wall surface on the side of the cutout of the midsole 111 and the second opposing surface 31 that is the outer surface of the fixing wall 30 are both formed in the substantially planar shape, and the shock absorber 1D1 and the midsole 111 are fixed at the portion by bonding the adhesive layer 113 to these surfaces. As illustrated in FIG. 14A, the plurality of through-holes 32 (13) are made in the fixing wall 30 as described above, and a part of the adhesive layer 113 enters the plurality of through-holes 32 (13). In addition, as illustrated in FIG. 14B, the plurality of through-holes 32 are made in the fixing wall 30 as described above, and a part of the adhesive layer 113 enters the plurality of through-holes 32 (13). Thus, an increase in bonding strength at the portion is achieved by an increase in bonding area and a kind of anchor effect.

As described above, the upper support 21, the lower support 22, and the fixing wall 30 are firmly fixed to the midsole 111 and the outsole 112, and the shock absorbers 1D1 to 1D3 can be effectively prevented from peeling off from the midsole 111 and the outsole 112. Furthermore, by providing the plurality of through-holes 21a, 22a, 32 in the upper support 21, the lower support 22, and the fixing wall 30, the joint strength at the portion is increased, and the shoe sole 110 having excellent durability and the shoe 100 including the shoe sole 110 can be obtained.

At this point, as illustrated in FIGS. 14A and 14B, in the shoe sole 110 of the second embodiment, the first opposing surface 111a that is the wall surface on the side of the cutout of the midsole 111 is inclinedly provided so as to be inclined with respect to the direction (that is, the thickness direction (Z-axis direction) of the sole body including the midsole 111 and the outsole 112) orthogonal to the tread 112a, and more specifically, the first opposing surface 111a is inclinedly provided such that the lower end of the first opposing surface 111a is located inside the sole body and such that the upper end of the first opposing surface 111a is located outside the sole body. On the other hand, the fixing wall 30 of the shock absorber 1D1 is provided to be inclined with respect to the thickness direction of the sole body such that the second opposing surface 31 is parallel to the first opposing surface 111a.

The fixing wall 30 inclined with respect to the thickness direction of the sole body can be formed by arranging the plurality of three-dimensional structure bodies 12 in a row along the fixing wall 30 such that each of the plurality of three-dimensional structure bodies 12 included in the shock absorbing portion 10 is formed of the unit structure body having the trapezoidal space as the unit space S as described above and such that the above-described inclined ends of the plurality of three-dimensional structure bodies 12 are connected to the fixing wall 30.

As described above, because a boundary between the midsole 111 and the shock absorber 1D1 is inclined with respect to the thickness direction of the sole body, the rigidity in the thickness direction of the sole body at the portion can be significantly reduced as compared with the case where the fixing wall 30 of the shock absorber 1D1 is provided so as to be parallel to the thickness direction of the sole body.

Consequently, with such the configuration, the increase in rigidity can be effectively prevented at the boundary between the midsole 111 and the shock absorber 1D1 as compared with the periphery, and the shoe sole 110 having excellent wearing comfortableness and the shoe 100 including the shoe sole 110 can be provided.

At this point, as illustrated in FIGS. 12 to 14B (in particular, FIGS. 13, 14A, and 14B), in the shoe sole 110 of the second embodiment, the shock absorbers 1D1 to 1D3 include the reinforcing portions 40, 40', 40" in addition to the shock absorbing portion 10, the upper support 21, the lower support 22, and the fixing wall 30.

More particularly, in the shoe sole 110, when viewed along the thickness direction (that is, the Z-direction in the drawing) of the sole body, which is the direction orthogonal to the tread 112a, the lower support 22 has a protruding region protruding outward from the end on the side of the lower support 22 of the three-dimensional structure body 12. When no treatment is performed, the protruding region becomes the portion having extremely small rigidity as compared with the surroundings, and is easily deformed by the application of the external force, and as a result, the portion may be damaged relatively early by repeated use or the like.

In the shoe sole 110 of the second embodiment, as illustrated in FIGS. 13 and 14A, in order to prevent the deformation of the lower support 22 in the protruding region, the reinforcing portion 40 is provided so as to connect the portion close to the end on the side of the lower support 22 of the three-dimensional structure body 12 and the lower support 22 of the portion corresponding to the protruding region. The reinforcing portion 40 is formed by embedding a part of the space surrounding the periphery of the three-dimensional structure body 12, and the rigidity in the portion is increased by forming the reinforcing portion 40, and the lower support 22 of the portion corresponding to the protruding region can be prevented from being excessively deformed.

Consequently, the shoe sole 110 having the excellent durability and the shoe 100 including the shoe sole 110 can be provided by adopting this configuration. Because the reinforcing portion 40 also has a function of preventing excessive compressive deformation of the shock absorbing portion 10 as a secondary function, when this configuration is adopted, the shoe sole 110 having the excellent durability and the shoe 100 including the shoe sole 110 can also be obtained in this respect.

On the other hand, as illustrated in FIGS. 13 and 14A, the reinforcing portion 40' is provided so as to connect the portion closer to the end on the side of the upper support 21 of the three-dimensional structure body 12 and the upper support 21. Similarly to the reinforcing portion 40, the reinforcing portion 40' is also formed by embedding a part of the space surrounding the periphery of the three-dimensional structure body 12. When configured in such manner, the shock absorbing portion 10 can be prevented from being excessively compressed and deformed, and the shoe sole 110 having the excellent durability and the shoe 100 including the shoe sole 110 can be obtained.

Furthermore, as illustrated in FIGS. 13 and 14B, the reinforcing portion 40" is formed by embedding a part of the space surrounding the periphery of the three-dimensional structure body 12 so as to connect adjacent three-dimensional structure bodies 12. With such the configuration, in particular, even when the external force is applied to the shock absorber 1D1 along the direction parallel to the tread 112a, the shock absorber 1D1 can be prevented from being excessively compressed and deformed, and the shoe sole 110 having the excellent durability and the shoe 100 including the shoe sole 110 can be obtained.

Figure 15A:
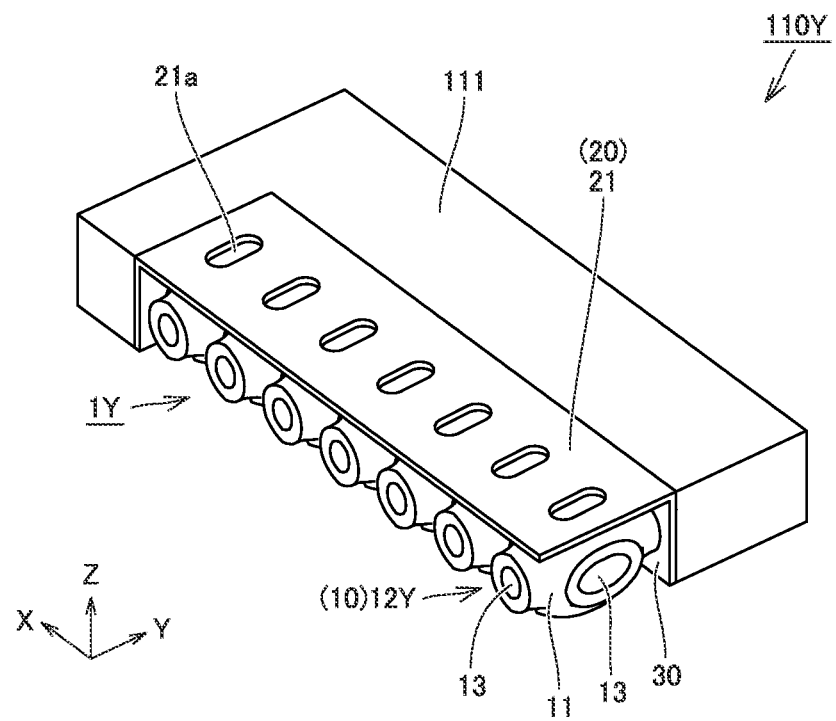
FIG. 15A is a perspective view illustrating a simulation model of the shoe sole according to a second comparative example.
Figure 15B:
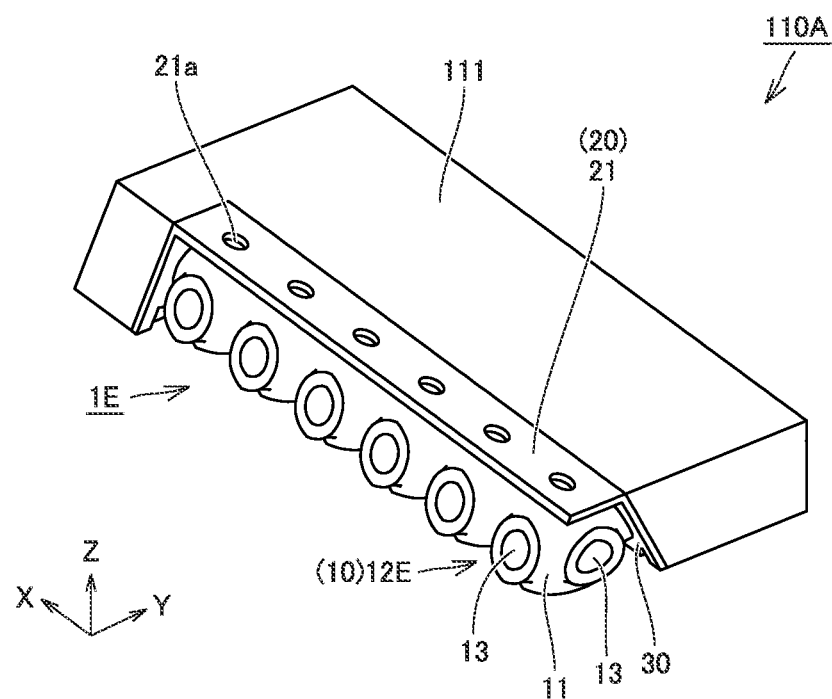
FIG. 15B is a perspective view illustrating a simulation model of the shoe sole according to a fourth example.
Figure 16:
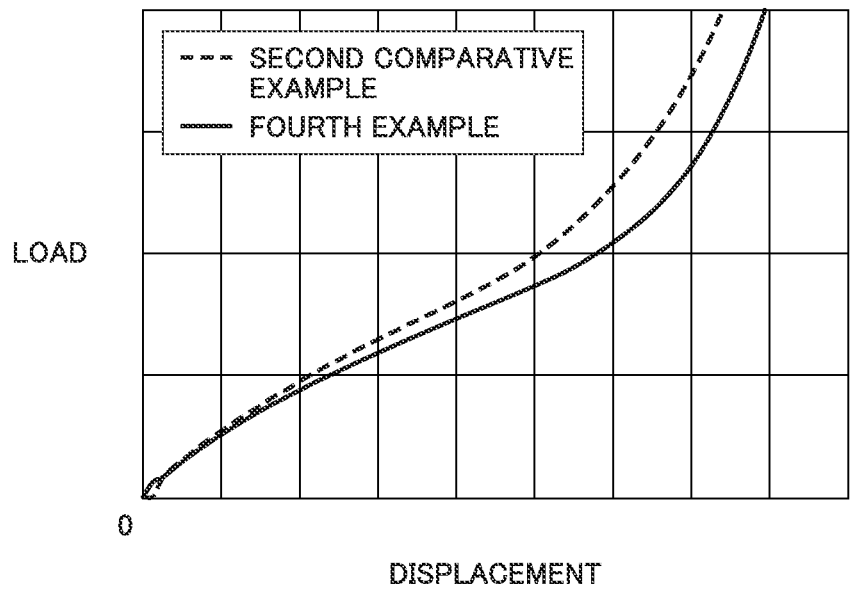
FIG. 16 is a graph illustrating simulation results of the shock absorbing performance of the shoe soles of the second comparative example and the fourth example.

FIGS. 15A and 15B are perspective views illustrating simulation models of the shoe sole according to a second comparative example and a fourth example, and FIG. 16 is a graph illustrating a simulation result of the shock absorbing performance of the shoe sole according to the second comparative example and the fourth example. With reference to FIGS. 15A to 16, a second verification test conducted by the present inventor will be described in detail in order to check the effect obtained by inclining the fixing wall 30 with respect to the thickness direction of the sole body.

In the second verification test, the simulation models of the shoe sole of the second comparative example and the fourth example were specifically produced, the case where the external force was applied to these simulation models along a predetermined direction was assumed, and the behavior in that case was individually analyzed by simulation. More specifically, for each of these simulation models, what is called a load-displacement curve at the boundary between the midsole and shock absorber was obtained.

At this point, as illustrated in FIG. 15A, a shock absorber 1Y having a three-dimensional structure body 12Y in which the shape in the unloaded state is obtained by stretching the regular hexahedron shaped unit space S' of the shock absorber 1' as the reference in the Y-axis direction, further slightly stretching the unit space S' in the Z-axis direction, and changing the shape of the unit structure body U' so as to follow the shape change to the unit space S' having the rectangular parallelepiped shape is used in a simulation model 110Y of the shoe sole of the second comparative example.

The shock absorber 1Y includes the upper support 21 and the fixing wall 30, and the fixing wall 30 is configured of a vertical wall parallel to the thickness direction of the sole body. Thus, the second opposing surface 31 (see FIGS. 14A and 14B) provided in the fixing wall 30 is configured of the surface parallel to the thickness direction of the sole body, and as a result, the first opposing surface 111a (see FIGS. 14A and 14B) that is the wall surface on the side of the cutout of the midsole 111 is also configured of the surface parallel to the thickness direction of the sole body.

On the other hand, as illustrated in FIG. 15B, similarly to the shock absorber 1 of the first embodiment, a shock absorber 1E having a three-dimensional structure body 12E in which the shape in the unloaded state is obtained by changing the shape of the unit structure body U' so as to follow the shape change of the regular hexahedron shaped unit space S' of the shock absorber 1' as the reference to the trapezoidal shape is used in a simulation model 110A of the shoe sole of the fourth example.

The shock absorber 1E includes the upper support 21 and the fixing wall 30, and the fixing wall 30 is configured of a wall inclined with respect to the thickness direction of the sole body. Thus, the second opposing surface 31 (see FIGS. 14A and 14B) provided in the fixing wall 30 is configured of the surface inclined with respect to the thickness direction of the sole body, and as a result, the first opposing surface 111a (see FIGS. 14A and 14B) that is the wall surface on the side of the cutout of the midsole 111 is also configured of the surface inclined with respect to the thickness direction of the sole body.

At this point, in the simulation model 110Y of the shoe sole of the second comparative example and the simulation model 110A of the fourth example, all conditions were set to be the same except for the points described above. The direction of the external force applied to the simulation models 110Y, 110A of the shoe sole of the second comparative example and the fourth example was set to the vertical direction (that is, the Z-axis direction).

As illustrated in FIG. 16, comparing the simulation model 110Y of the shoe sole of the second comparative example with the simulation model 110A of the shoe sole of the fourth example, it can be seen that the rigidity at the boundary between the midsole 111 and the shock absorbers 1Y, 1E is lower in the simulation model 110A of the shoe sole of the fourth example than in the simulation model 110Y of the shoe sole of the second comparative example.

Consequently, based on the results of the second verification test, it can be said that it has been experimentally checked that both the wearing comfortableness and the shock absorbing performance are achieved using the shoe sole 110 of the second embodiment and the shoe 100 including the shoe sole 110.

First Modification

Figure 17:
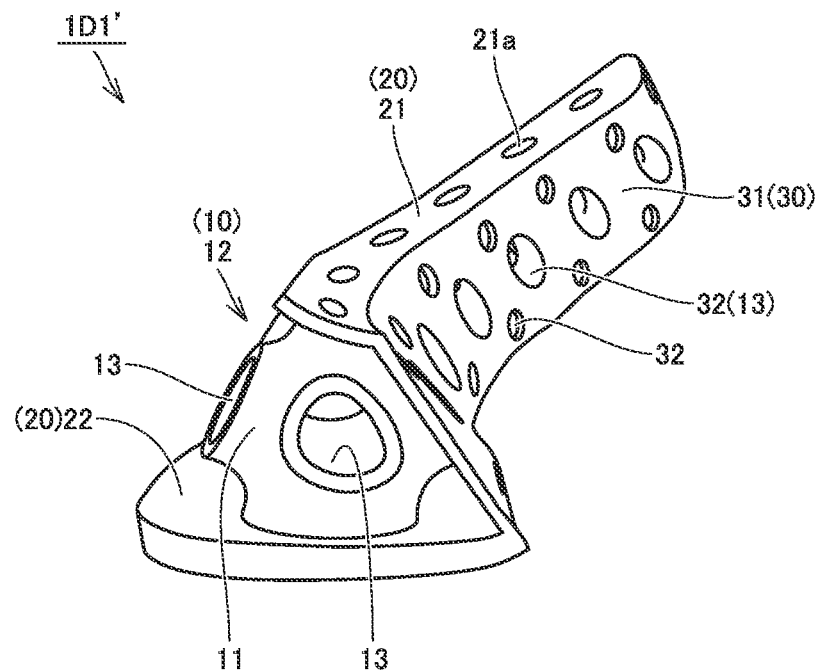
FIG. 17 is a perspective view illustrating a shock absorber included in a shoe sole according to a first modification.

FIG. 17 is a perspective view illustrating a shock absorber included in a shoe sole according to a first modification. With reference to FIG. 17, a shock absorber 1D1' included in the shoe sole of the first modification based on the second embodiment will be described below. The shock absorber 1D1' is provided in the shoe sole 110 instead of the shock absorber 1D1 included in the shoe sole 110 of the second embodiment.

As illustrated in FIG. 17, the shock absorber 1D1' included in the shoe sole of the first modification is different from the shock absorber 1D1 included in the shoe sole 110 of the second embodiment only in that the reinforcing portions 40, 40', 40" are not provided. That is, the shock absorber 1D1' includes only the shock absorbing portion 10 configured of the plurality of three-dimensional structure bodies 12, the upper support 21 and the lower support 22 as the support 20, and the fixing wall 30.

Even when configured in such manner, the effect of the first embodiment can be obtained, and the increase in rigidity at the boundary between the midsole 111 and the shock absorber 1D1' as compared with the periphery can be effectively prevented, whereby the shoe sole excellent wearing comfortableness and the shoe including the shoe sole can be obtained.

Second Modification

Figure 18:
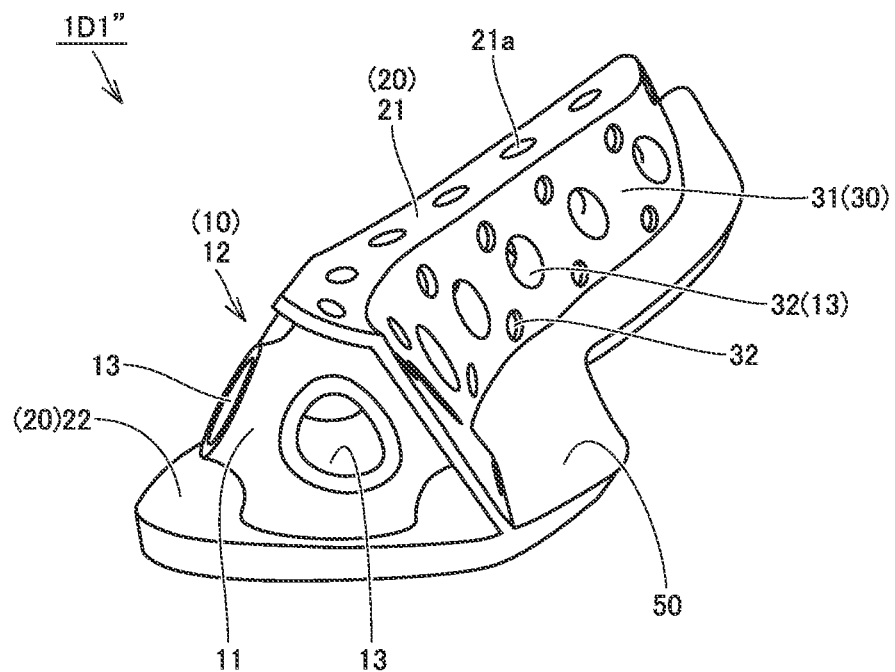
FIG. 18 is a perspective view illustrating a shock absorber included in a shoe sole according to a second modification.

FIG. 18 is a perspective view illustrating a shock absorber included in a shoe sole according to a second modification. With reference to FIG. 18, a shock absorber 1D1" included in the shoe sole of the second modification based on the second embodiment will be described below. The shock absorber 1D1" is provided in the shoe sole 110 instead of the shock absorber 1D1 included in the shoe sole 110 of the second embodiment.

As illustrated in FIG. 18, the shock absorber 1D1" included in the shoe sole of the second modification is different from the shock absorber 1D1' included in the shoe sole of the first modification only in that the extension portion 50 is provided. Specifically, the extension portion 50 has a plate shape, and extends from the connecting portion between the lower support 22 and the fixing wall 30 along the extending direction of the lower support 22 so as to exceed the fixing wall 30.

In the extension portion 50, the shock absorber 1D1" is a region increasing the joint area with respect to the midsole 111 and the outsole 112, and the shock absorber 1D1" is more firmly joined to the midsole 111 and the outsole 112 by providing the extension portion 50.

Consequently, in the case of such the configuration, the effect of the first embodiment can be obtained, and it is possible to effectively suppress the increase in rigidity at the boundary between the midsole 111 and the shock absorber 1D1" can be effectively prevented as compared with the periphery, so that not only the shoe sole having the excellent wearing comfortableness and the shoe including the shoe sole can be obtained, but also the shoe sole having the excellent durability and the shoe including the shoe sole can be obtained.

Summary of Disclosure in Embodiments

Characteristic configurations disclosed in the first and second embodiments, the first to fourth examples, and the modifications are summarized below.

The shock absorber according to one aspect of the present disclosure includes the shock absorbing portion having the three-dimensional shape formed by the wall in which the outer shape is defined by the pair of parallel curved surfaces. The shock absorbing portion includes at least one three-dimensional structure body obtained by changing the shape of the unit structure body thickened based on the unit structure of the Schwartz P structure. The shape of the three-dimensional structure body in the unloaded state is a shape obtained by changing the shape of the unit structure body so as to follow the shape change of the unit space body, which is a regular hexahedron shaped space occupied by the unit structure body, into a trapezoidal space.

In the shock absorber according to one aspect of the present disclosure, in the case where the direction in which the shock absorbing function is exerted when the shock absorbing portion receives the load is set to the axial direction, the shape of the three-dimensional structure body in the unloaded state may be the shape obtained by changing the shape of the unit structure body so as to follow the shape change of the unit space that is the regular hexahedron shaped space to the trapezoidal space when each of surfaces included in one of two pairs of opposing surfaces excluding one pair of opposing surfaces located in the axial direction among the three pairs of opposing surfaces.

In the shock absorber according to one aspect of the present disclosure, in the case where the direction in which the shock absorbing function is exerted when the shock absorbing portion receives the load is set to the axial direction, the shape of the three-dimensional structure body in the unloaded state may be the shape obtained by changing the shape of the unit structure body so as to follow the shape change of the unit space that is the regular hexahedron shaped space to the trapezoidal space when each of surfaces included in two pairs of opposing surfaces excluding one pair of opposing surfaces located in the axial direction among the three pairs of opposing surfaces.

In the shock absorber according to one aspect of the present disclosure, the flat plate-shaped support orthogonal to the axial direction may be provided on at least one of the pair of ends located in the axial direction of the three-dimensional structure body.

In the shock absorber according to one aspect of the present disclosure, when viewed along the axial direction, the support may have the protruding region that protrudes outward from the end on the support side of the three-dimensional structure body, and in this case, the reinforcing portion preventing the deformation of the support in the protruding region may be provided so as to connect the portion of the three-dimensional structure body close to the end on the support side and the support of the portion corresponding to the protruding region.

In the shock absorber according to one aspect of the present disclosure, the shock absorbing portion may include the plurality of the three-dimensional structure bodies, and in this case, the plurality of three-dimensional structure bodies may be arranged in a row such that the axial directions thereof are located substantially in parallel.

In the shock absorber according to one aspect of the present disclosure, the shock absorbing portion may include the plurality of the three-dimensional structure bodies, and in this case, the plurality of three-dimensional structure bodies may be arranged in the matrix shape such that the axial directions thereof are located substantially in parallel.

The shoe sole according to one aspect of the present disclosure includes the shock absorber according to an aspect of the present disclosure.

In the shoe sole according to one aspect of the present disclosure, the shock absorber may be disposed such that the axial direction in which the shock absorbing portion exerts the shock absorbing function by receiving the load is orthogonal to the tread.

The shoe according to one aspect of the present disclosure includes the shoe sole according to one aspect of the present disclosure and the upper provided above the shoe sole.

Other Embodiments

In the second embodiment and the modifications thereof, the case where the shock absorber is disposed along a part of the shoe sole has been described as an example. However, the position at which the shock absorber is provided is not limited thereto, and can be appropriately changed. For example, the shock absorber may be disposed along the entire circumference of the shoe sole, or the shock absorber may be disposed at the position inside the circumference of the shoe sole. Furthermore, the shock absorber may be disposed over the entire area of the shoe sole. In addition, the shock absorber may be disposed only in any one of the medial foot side portion and the lateral foot side portion of the shoe sole according to the type and use of competition in which the shoe is used. Furthermore, the shock absorber may be provided between the midsole and the upper, or the shock absorber itself may also serve as the outsole. At this point, when the shock absorber is provided on the entire surface of the shoe sole, the entire midsole may be replaced with the shock absorber.

Furthermore, in the second embodiments and modifications thereof, the present invention is applied to the shoe including the tongue and the shoelace by way of example. However, the present invention may be applied to a shoe without these components (such as a shoe including a sock-shaped upper) and a shoe sole included in the shoe.

Furthermore, in the second embodiment and the modifications thereof, the case where the shock absorber of the present invention is applied to the shoe sole of the shoe has been described as an example. However, the shock absorber of the present invention can be used for other shock absorbing applications. For example, the shock absorber of the present invention can be used in various applications such as packaging materials, floor materials for buildings (for example, houses), surface materials for paved roads, surface materials for sofas, chairs, and the like, and tires.

The characteristic configurations disclosed in the first and second embodiments, the first to fourth examples, and modifications thereof can be combined with one another in a range without departing from the gist of the present invention.

Although the embodiments of the present invention have been described, it should be considered that the disclosed embodiments are an example in all respects and not restrictive. The scope of the present invention is indicated by the claims, and it is intended that all modifications within the meaning and scope of the claims are included in the present invention.

What is claimed is:

1. A shoe sole including an outsole and a midsole, the midsole having a shock absorber, the shock absorber comprising:

a shock absorbing portion having a three-dimensional shape configured by a wall in which an outer shape is defined by a pair of opposed curved surfaces, wherein the shock absorbing portion includes at least one three-dimensional structure body having a Schwartz P structure, a shape of each three-dimensional structure body in an unloaded state is a hexahedron having an outer peripheral shape which is trapezoidal, and a direction in which the shock absorbing portion is intended to exert a shock absorbing function by receiving a load is an axial direction orthogonal to a tread of the outsole, and the shape of the at least one three-dimensional structure body in the unloaded state comprises inclined surfaces included in one of two pairs of opposing surfaces excluding one pair of opposing surfaces located in the axial direction among three pairs of opposing surfaces.

2. The shoe sole according to claim 1, further comprising:
a flat plate-shaped support orthogonal to the axial direction on at least one of a pair of ends located in the axial direction of the three-dimensional structure body.

3. The shoe sole according to claim 2, wherein
when viewed along the axial direction, the support includes a protruding region that protrudes outward from an end on a side of the support of the three-dimensional structure body, and the shock absorber further comprises:
a reinforcing portion preventing deformation of the support in the protruding region and connecting a portion close to the end on the side of the support of the three-dimensional structure body and the support of a portion corresponding to the protruding region.

4. The shoe sole according to claim 1, wherein
the shock absorbing portion includes a plurality of the three-dimensional structure bodies, and the plurality of three-dimensional structure bodies are arranged in a row such that the axial directions of the plurality of three-dimensional structure bodies are located substantially parallel to each other.

5. The shoe sole according to claim 1, wherein
the shock absorbing portion includes a plurality of the three-dimensional structure bodies, and the plurality of three-dimensional structure bodies are arranged in a matrix shape such that the axial directions of the plurality of three-dimensional structure bodies are located substantially parallel to each other.

6. A shoe comprising:
a shoe sole according to claim 1; and
an upper above the shoe sole.

7. The shoe sole according to claim 1, wherein
the shape of the at least one three-dimensional structure body in the unloaded state comprises inclined surfaces included in two pairs of opposing surfaces excluding one pair of opposing surfaces located in the axial direction among three pairs of opposing surfaces.

8. The shoe sole according to claim 7, further comprising:
a flat plate-shaped support orthogonal to the axial direction on at least one of a pair of ends located in the axial direction of the three-dimensional structure body.

9. The shoe sole according to claim 8, wherein
when viewed along the axial direction, the support includes a protruding region that protrudes outward from an end on a side of the support of the three-dimensional structure body, and the shock absorber further comprises:
a reinforcing portion preventing deformation of the support in the protruding region and connecting a portion close to the end on the side of the support of the three-dimensional structure body and the support of a portion corresponding to the protruding region.

10. The shoe sole according to claim 7, wherein
the shock absorbing portion includes a plurality of the three-dimensional structure bodies, and the plurality of three-dimensional structure bodies are arranged in a row such that the axial directions of the plurality of three-dimensional structure bodies are located substantially parallel to each other.

11. The shoe sole according to claim 7, wherein
the shock absorbing portion includes a plurality of the three-dimensional structure bodies, and the plurality of three-dimensional structure bodies are arranged in a matrix shape such that the axial directions of the plurality of three-dimensional structure bodies are located substantially parallel to each other.

12. A shoe comprising:
the shoe sole according to claim 7; and
an upper above the shoe sole.

* * * * *